(12) United States Patent
Seguchi et al.

(10) Patent No.: US 7,710,288 B2
(45) Date of Patent: May 4, 2010

(54) WIRELESS SELF-POWERED SENSOR

(75) Inventors: Koji Seguchi, Rochester Hills, MI (US); James Dulgerian, Troy, MI (US)

(73) Assignee: Alps Automotive, Inc., Auburn Hills, MI (US)

( * ) Notice: Subject to any disclaimer, the term of this patent is extended or adjusted under 35 U.S.C. 154(b) by 0 days.

(21) Appl. No.: 11/941,708

(22) Filed: Nov. 16, 2007

(65) Prior Publication Data

US 2008/0129482 A1 Jun. 5, 2008

Related U.S. Application Data

(63) Continuation-in-part of application No. 11/670,240, filed on Feb. 1, 2007.

(60) Provisional application No. 60/772,477, filed on Feb. 9, 2006.

(51) Int. Cl.
*G08B 21/00* (2006.01)

(52) U.S. Cl. ............... 340/686.4; 340/457.1; 340/687; 335/177

(58) Field of Classification Search ............ 340/457.1, 340/686.1, 686.4, 686.5, 687, 542; 307/112–144; 310/10, 12; 335/177, 179, 180, 270–292; 324/207.26

See application file for complete search history.

(56) References Cited

U.S. PATENT DOCUMENTS

| | | | |
|---|---|---|---|
| 5,394,131 A * | 2/1995 | Lungu | 335/229 |
| 5,406,262 A | 4/1995 | Herman et al. | |
| 5,528,219 A | 6/1996 | Frohlich et al. | |
| 5,675,534 A * | 10/1997 | Hewitt et al. | 365/185.04 |
| 5,762,299 A | 6/1998 | Motsch | |
| 6,167,137 A * | 12/2000 | Marino et al. | 380/255 |
| 6,357,091 B1 * | 3/2002 | Devereaux | 24/633 |
| 6,384,595 B1 * | 5/2002 | Ito et al. | 324/207.13 |
| 6,700,310 B2 | 3/2004 | Maue et al. | |
| 6,741,237 B1 | 5/2004 | Benard et al. | |

(Continued)

FOREIGN PATENT DOCUMENTS

JP 2001-000211 1/2001

OTHER PUBLICATIONS

International Search Report issued in corresponding PCT Application No. PCT/US07/61644; mailed Mar. 14, 2008.
International Preliminary Report on Patentability of International U.S. Appl. No. PCT/US2007/61644; mailed Aug. 21, 2008.
"A Compact, Wireless, Self-Powered Pushbutton Controller," Joseph A. Paradiso and Mark Feldmeier. In Abowd, G.D., Brumitt, B., and Safer, S., eds, "Ubicomp 2001: Ubiquitous Computing," ACM UBICOMP Conference Proceedings, Atlanta GA, Sep. 2001, Springer-Verlag Berlin Heidelberg, 2001, pp. 299-304.

*Primary Examiner*—Daniel Wu
*Assistant Examiner*—Ryan W Sherwin
(74) *Attorney, Agent, or Firm*—Brinks Hofer Gilson & Lione

(57) ABSTRACT

A self-powered sensor detects or measures an event by converting one form of energy into another form. The converted energy may be conditioned and regulated to drive a wireless transmitter and encoder. A receiver may detect and validate a received message. If validated, the message may be processed or decrypted and processed to determine what has been identified or requested.

24 Claims, 23 Drawing Sheets

U.S. PATENT DOCUMENTS

| | | |
|---|---|---|
| 6,747,573 B1 | 6/2004 | Gerlach et al. |
| 7,002,457 B2 | 2/2006 | Stevenson et al. |
| 2002/0180200 A1 | 12/2002 | Tokugawa |
| 2003/0209893 A1 | 11/2003 | Breed et al. |
| 2003/0221118 A1 | 11/2003 | Walker |
| 2004/0051631 A1* | 3/2004 | Metlitzky et al. ...... 340/426.11 |
| 2005/0030153 A1* | 2/2005 | Mullet et al. ............... 340/5.25 |
| 2005/0061568 A1 | 3/2005 | Schondorf et al. |
| 2005/0280561 A1 | 12/2005 | Face et al. |
| 2007/0285219 A1* | 12/2007 | Greene .................... 340/457.1 |

* cited by examiner

US 7,710,288 B2

WIRELESS SELF-POWERED SENSOR

PRIORITY CLAIM

This application is a continuation-in-part of U.S. application Ser. No. 11/670,240, filed Feb. 1, 2007, which claims the benefit of priority from U.S. Provisional Application No. 60/772,477, filed Feb. 9, 2006, both of which are incorporated by reference.

BACKGROUND OF THE INVENTION

1. Technical Field

This invention relates to sensors, and more particularly, to a self-powered sensor that may be used in devices or structures for transporting persons or things.

2. Related Art

Vehicle safety devices are designed to protect the occupants of a vehicle. A safety strap or harness may hold a person securely to a seat while a vehicle is moving. A lap belt and/or shoulder harness may prevent an occupant from striking the interior of a vehicle in the event of an accident or when the vehicle suddenly stops. While statistics suggest that there is a higher rate of survival when occupants remain in their seats, safety belts are not universally used.

In some instances, occupants may not realize that their safety belts are not engaged. In some vehicles, a safety belt anchored to a driver seat is monitored. When a clasp does not engage the ends of a driver's safety belt, a warning may issue. Some monitors require that power be sourced to the driver's safety belt to detect when the safety belt is engaged. These monitors may not be used with other safety belts or active restraints due to wiring costs, wiring harness limitations, or electrical load limitations. In some systems it is impractical to wire removable vehicle seats. Therefore there is a need for a self-powered system that may monitor safety restraints.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A self-powered sensor detects or measures an event by converting non-electrical energy into electrical energy. In some systems a physical pressure applied to an element within the self-powered sensor may generate electrical impulses. When embodied or integrated within a transmitter or transceiver, the electrical impulses may be regulated. The self-powered sensor may drive a transmitter or transceiver and an encoder. The encoder may be used in a wireless monitoring system, wireless control system, wireless entry system, or other wireless applications. In operation, a receiver may detect and validate a received message. If validated, the message may be processed or decrypted and processed to determine what has been identified or requested.

Figure 1:
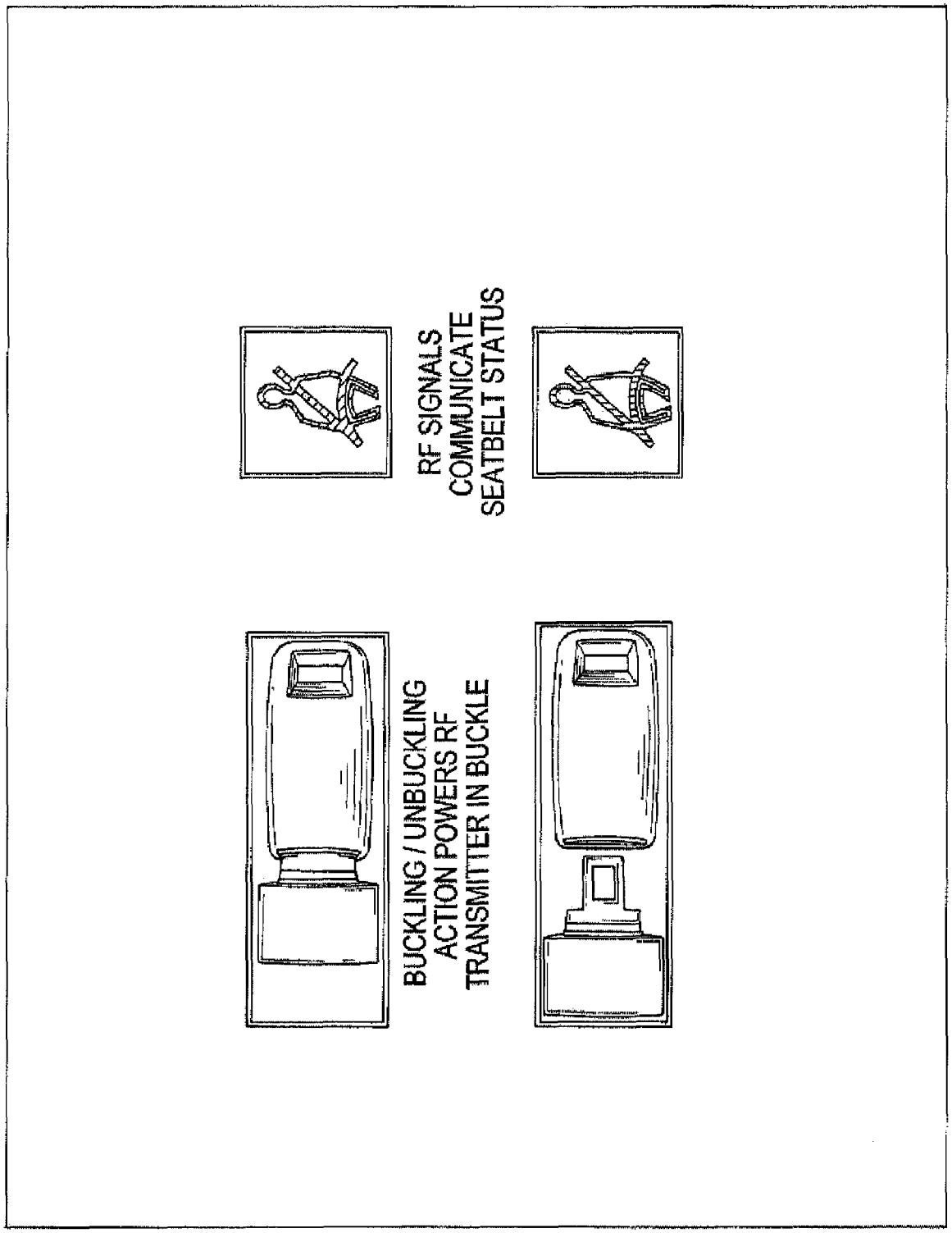
FIG. 1 shows a self-powered sensor within a safety belt buckle.

FIG. 1 shows the self-powered sensor integrated within a safety belt. The self-powered sensor is integrated or positioned within a female portion of a buckle. A transducer positioned near a proximal end of a clasp may detect a male end of the buckle. As the male end is inserted into the clasp, the mechanical stress of insertion is converted into electrical energy. In FIG. 1, the transducer generates electrical energy that powers a regulator that drives an encoder and transmitter. In FIG. 1 the transmitter may wirelessly send encoded data to a receiver. The signal may be received and validated by a controller in a vehicle. When assigned unique identification codes, the self-powered sensor may identify the engagement or retraction of each safety belt or seat belt within a vehicle. A vehicle may be a device or structure for transporting persons or things (e.g., an automobile, truck, bus, or aircraft). Engagement or retraction may be determined by a valid message or in combination with a measured time a valid message is received. The message may or may not be encrypted.

Figure 2:
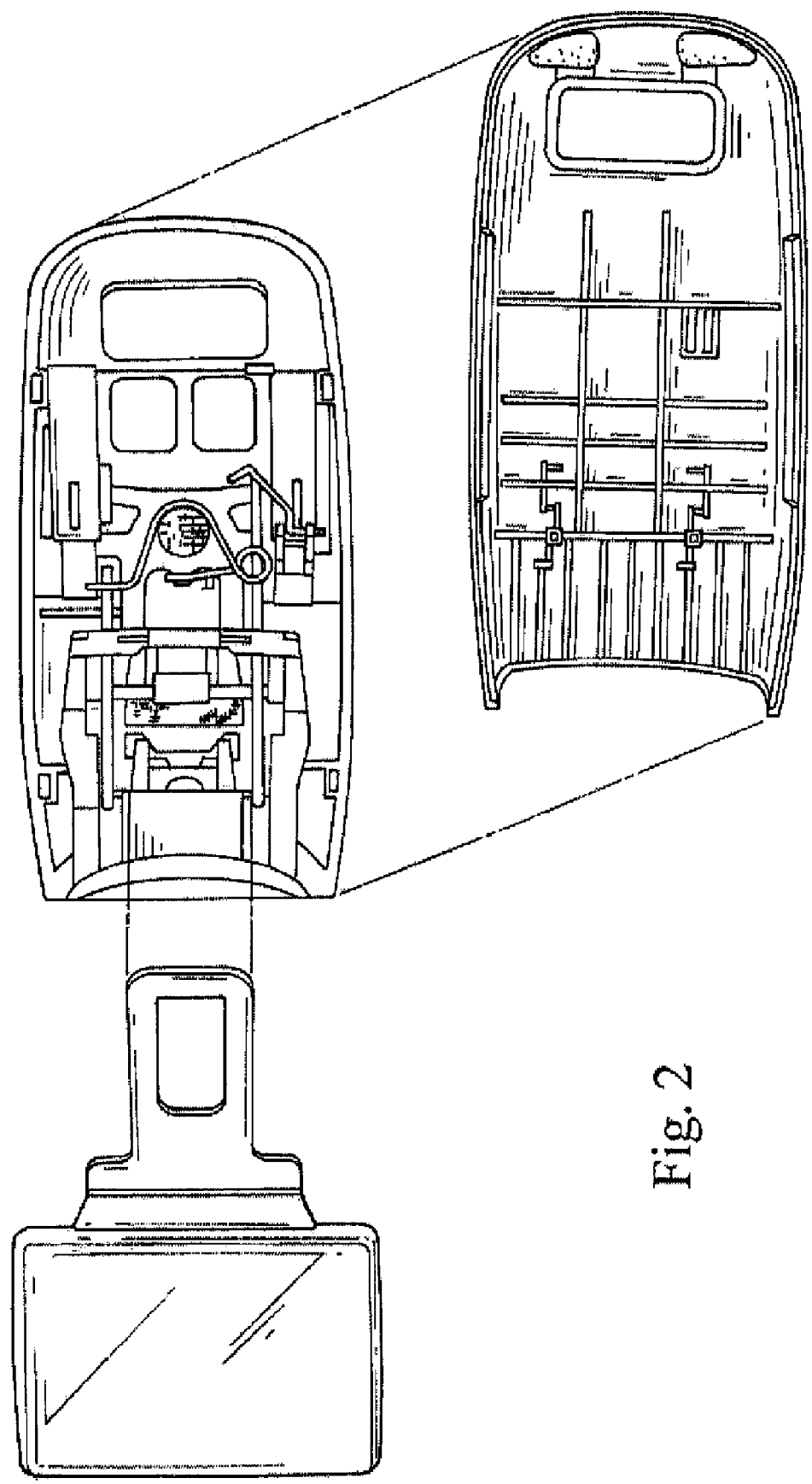
FIG. 2 is a top view of the self-powered sensor within the safety belt buckle.

FIG. 2 is a top view of the self-powered sensor within the safety belt of FIG. 1. While the transducer is positioned near the proximal end of the clasp, in alternative systems the transducer may be positioned anywhere within or on the buckle. In some alternative systems it is positioned on or near a male end of the buckle.

Figure 3:
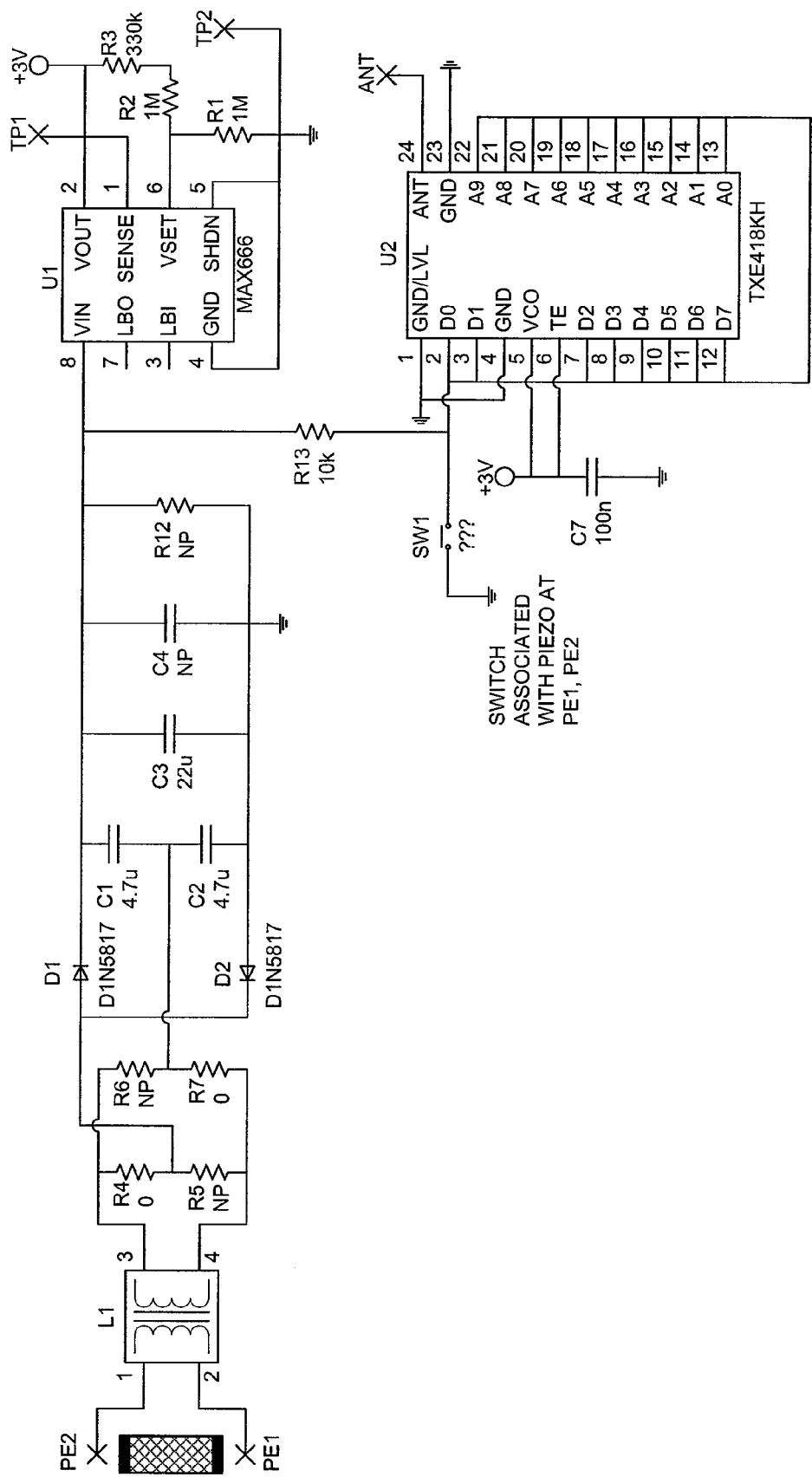
FIG. 3 is a schematic of the self-powered sensor coupled to a transcoder.

FIG. 3 is a schematic of a self-powered sensor coupled to a transcoder. The transcoder converts one type of energy (electrical energy) into another (radio frequency). Through an electrical link a piezoelectric ceramic or element generates electrical energy when subject to a mechanical stress. The generated electricity or voltage is conditioned by active elements, linear elements, and elements that pass current in one direction. Despite variations in the conditioned voltage, a voltage regulator may substantially source a constant output voltage when an input voltage is detected. In FIG. 3 the transcoder comprises an encoder such as a code hopping encoder that is integrated with or is a unitary part of a transmitter. In some systems the code hopping encoder may change a transmitted code word with almost every transmission. When a source voltage is generated by the voltage regulator, a message is first encrypted and then transmitted. In some systems a unique code word may be transmitted with the message. In other systems the message may be transmitted without encryption and code words.

Figure 4:
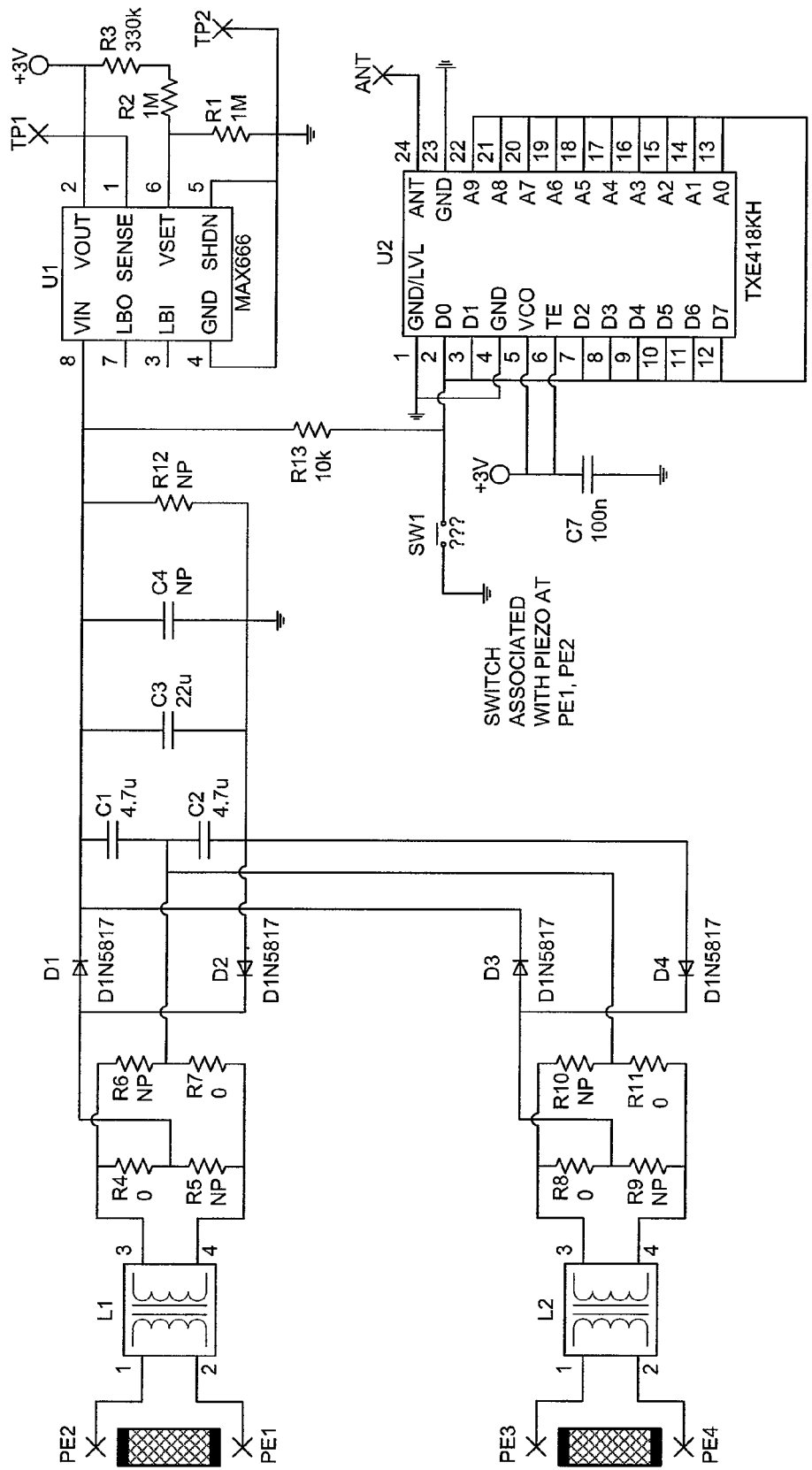
FIG. 4 is an alternative schematic of the self-powered sensor coupled to a transcoder.

FIG. 4 is a schematic of an alternative self-powered sensor coupled to a transcoder. Through an electrical link the piezoelectric ceramics or elements generate electricity when subject to a mechanical stress. The generated electricity or voltage is conditioned by active elements, linear elements, and diodes that control current flow. Despite variations in the conditioned voltage, a voltage regulator may source a substantially constant output voltage to the transcoder. In FIG. 4 the transcoder comprises an encoder such as a code hopping encoder that is integrated with a transmitter. When a source voltage is received, a message is encrypted and transmitted to a receiver. In some systems a unique code word may be transmitted with the message. In other systems the message may not be encrypted or transmitted with code words.

Figure 5:
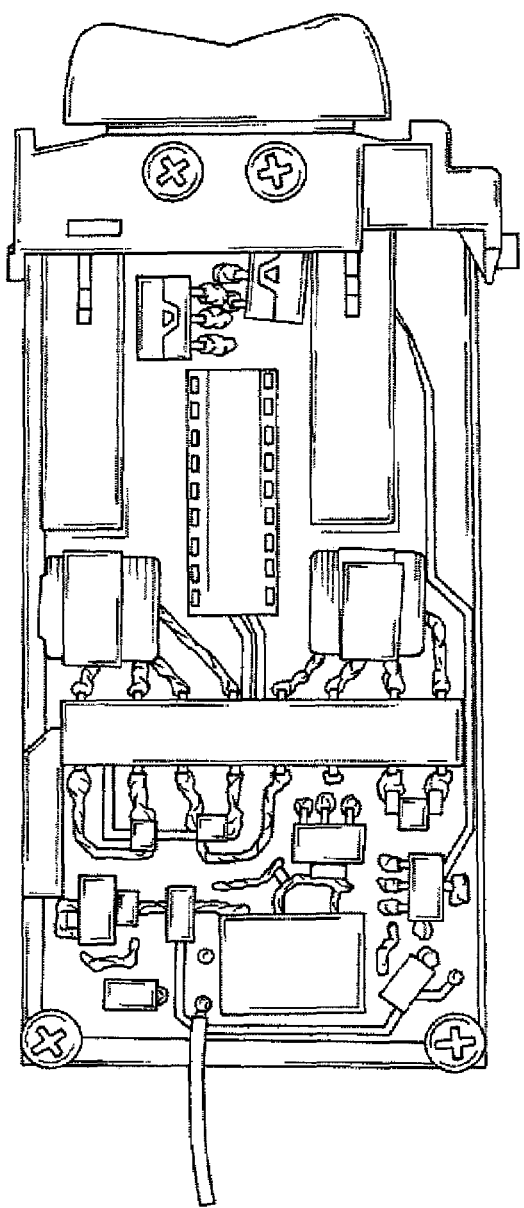
FIG. 5 is a side view of a self-powered sensor coupled to a toggle switch.
Figure 6:
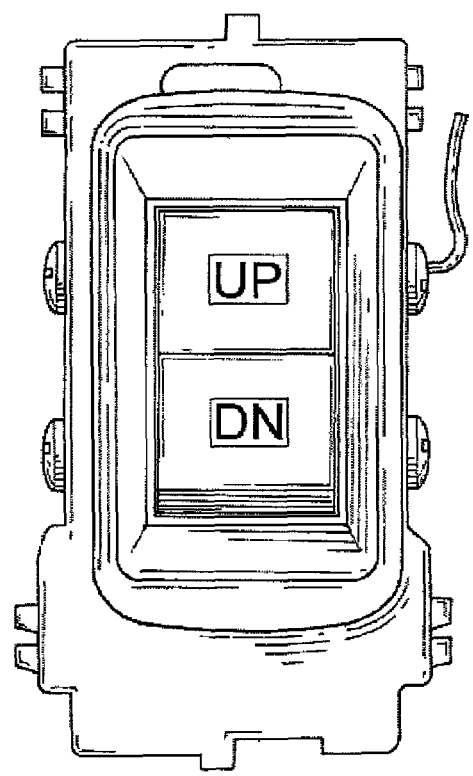
FIG. 6 is a top view of the toggle switch of FIG. 5.
Figure 7:
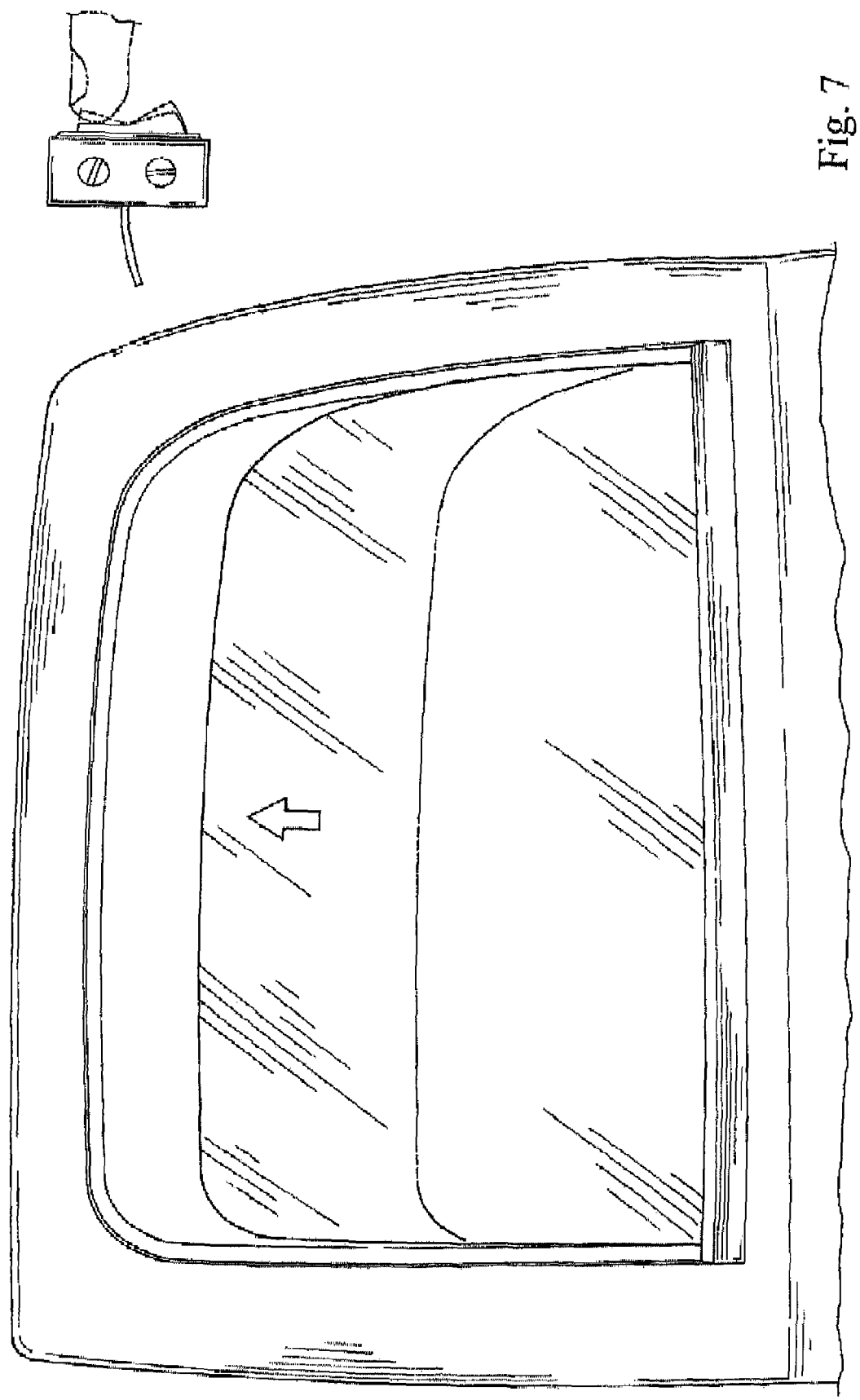
FIG. 7 is a side view of the self-powered sensor controlling the movement of a vehicle window.
Figure 8:
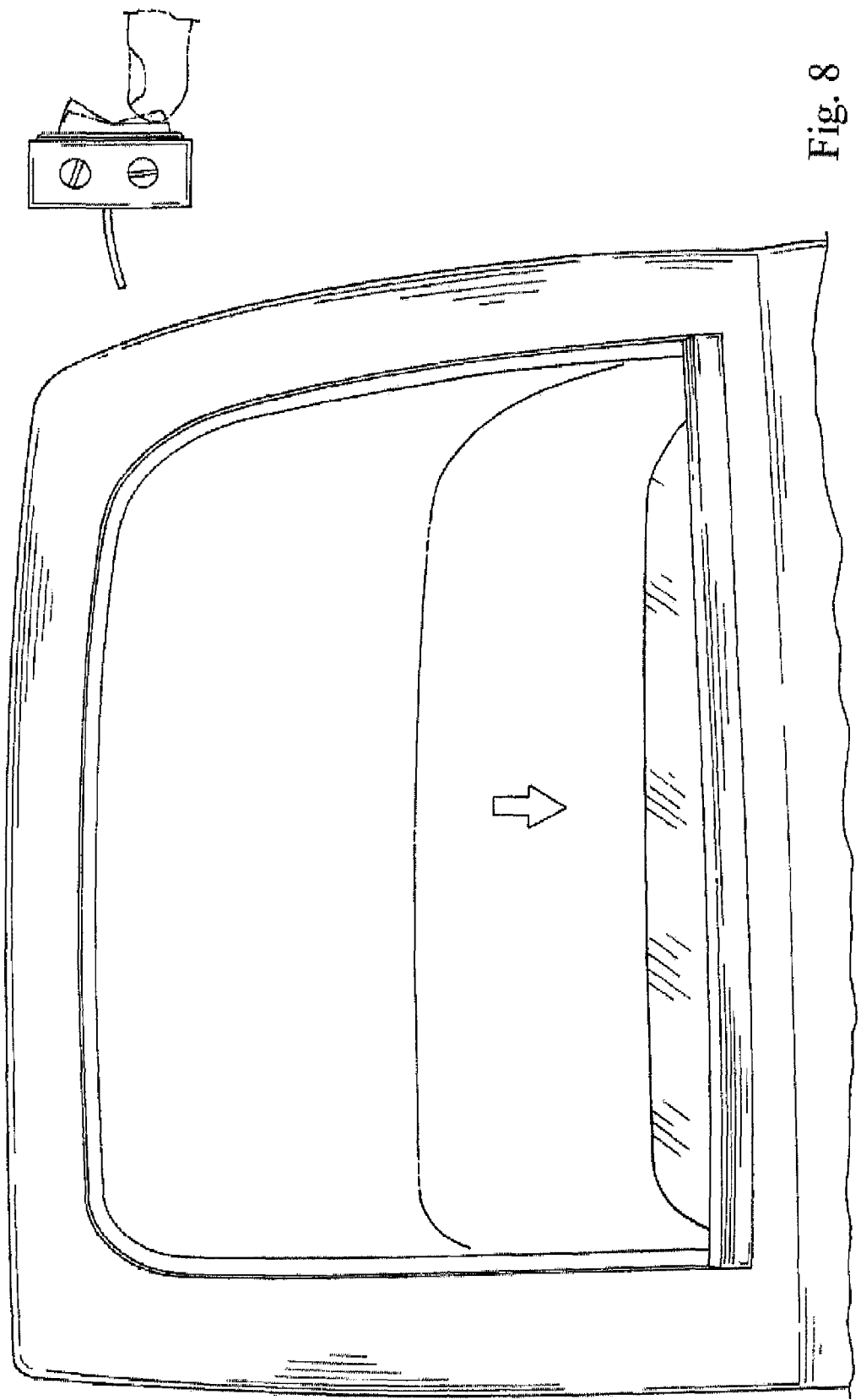
FIG. 8 is a second side view of the self-powered sensor controlling the movement of the vehicle window of FIG. 7.

In FIGS. 5 and 6 the self-powered sensor is coupled to a switch. As shown in FIGS. 7 and 8, engagement of the switch, such as a toggle switch, may raise or lower one or more windows. The window may be raised or lowered to any position depending on the duration the switch is actuated. The switch may include an express down feature whereby one or more windows go down fully by engaging the down portion of the switch for a predetermined time.

Figure 9:
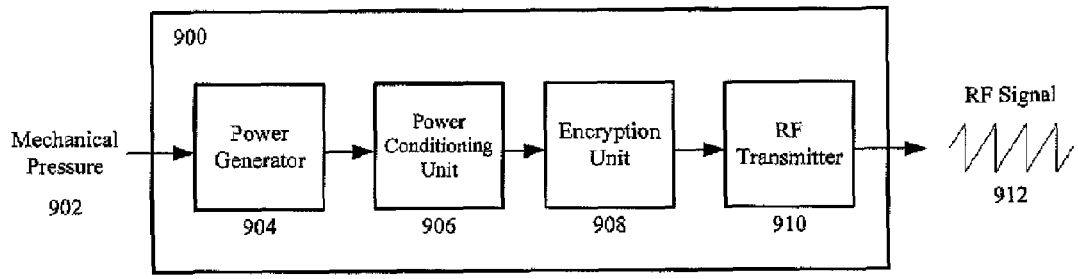
FIG. 9 is a block diagram of a self-powered sensor.

FIG. 9 is a block diagram of a self-powered sensor 900. The sensor 900 includes a power generator 904, a power conditioning unit 906, an encryption unit 908, and a radio frequency transmitter 910. A mechanical pressure 902 may be applied to the power generator 904. The power generator 904 converts the mechanical pressure 902 into an electrical signal that may source a power conditioning unit 906. The power conditioning unit 906 comprises passive and active circuit elements and a voltage regulator. The unit 906 may convert the electrical signal and source the voltage regulator. The voltage regulator may generate a substantially constant voltage and source an encryption unit 908. In FIG. 9, the encryption unit 908 may encode a message into data packets to be transmitted through a radio frequency transmitter 910. The radio frequency transmitter 910 transmits a radio frequency signal 912 to a receiver. In some systems, the radio frequency signal 912 may be encrypted and/or contain code words. In other systems, the radio frequency signal 912 may be transmitted without encryption and/or code words. The radio frequency signal 912 may be transmitted at about 315 MHz, about 433 MHz, or at other frequencies, and may be transmitted at various word lengths and power levels.

Figure 10:
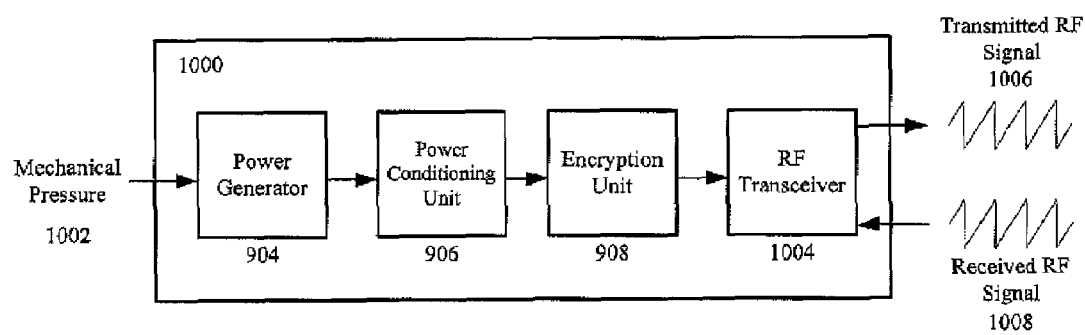
FIG. 10 is an alternative block diagram of a self-powered sensor.

FIG. 10 is a block diagram of an alternative self-powered sensor 1000. The sensor 1000 may include the power generator 904, the power conditioning unit 906, the encryption unit 908, and a radio frequency transceiver 1004. A mechanical pressure 1002 may be applied to the power generator 904, which converts the mechanical pressure 1002 into an electrical signal. The power generator 904 may be an element that generates electrical signals in response to a physical pressure, such as a piezoelectric ceramic or element; an element that generates electrical signals in response to a change in a magnetic field direction (e.g., an electro-dynamic generator); or a type of power generator that converts non-electrical energy into electrical energy. The electrical signal from the power generator 904 sources a power conditioning unit 906 that converts the electrical signal and sources a voltage regulator. The voltage regulator may generate a voltage that sources an encryption unit 908.

In FIG. 10, the encryption unit 908 may encode a message into fixed or variable data packets to be transmitted through a radio frequency transceiver 1004. The radio frequency transceiver 1004 transmits a radio frequency signal 1006 to a receiver or transceiver. The radio frequency transceiver 1004 may also receive a radio frequency signal 1008 from a transmitter or transceiver. The received radio frequency signal 1008 may contain information to update the sensor, synchronize code words, or contain other information or commands. The radio frequency signals 1006 and 1008 may be transmitted and received at about 315 MHz, at about 433 MHz, or at other frequencies, and may be transmitted and received at various power levels.

Figure 11:
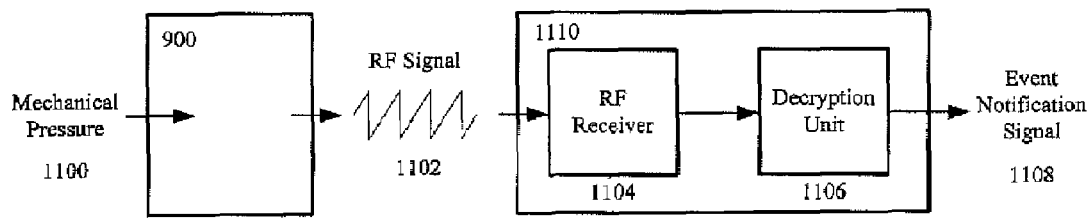
FIG. 11 is a block diagram of the self-powered sensor in communication with a receiver.

FIG. 11 is a block diagram of the self-powered sensor 900 in communication with a receiver 1110. The receiver 1110 includes a radio frequency receiver 1104 and a decryption unit 1106. A mechanical pressure 1100 may be applied to the power generator 904 within the sensor 900. The sensor 900 may transmit a radio frequency signal 1102 that may contain a message encoded into data packets. Redundant messages may be automatically transmitted to ensure the message is received at the receiver 1104. The receiver 1104 may receive and convert the radio frequency signal 1102 into data packets that may be communicated to the decryption unit 1106. The decryption unit 1106 may decode, process, and/or validate the data packets into an event notification signal 1108. The signal 1108 may be adapted to determine what has been identified or requested. The event notification signal 1108 may be transmitted over a vehicle data bus to electronic control units of a vehicle, such as an engine control module; body control module; heating, ventilating, and air conditioning ("HVAC") control module; or other control modules. The vehicle data bus may comprise a Controller Area Network ("CAN"), Local Interconnect Network ("LIN"), J1850, J1939, FlexRay, Media Oriented Systems Transport ("MOST"), DSI Bus, Intellibus, IDB-1394, SMARTwireX, or other vehicle data buses.

Figure 12:
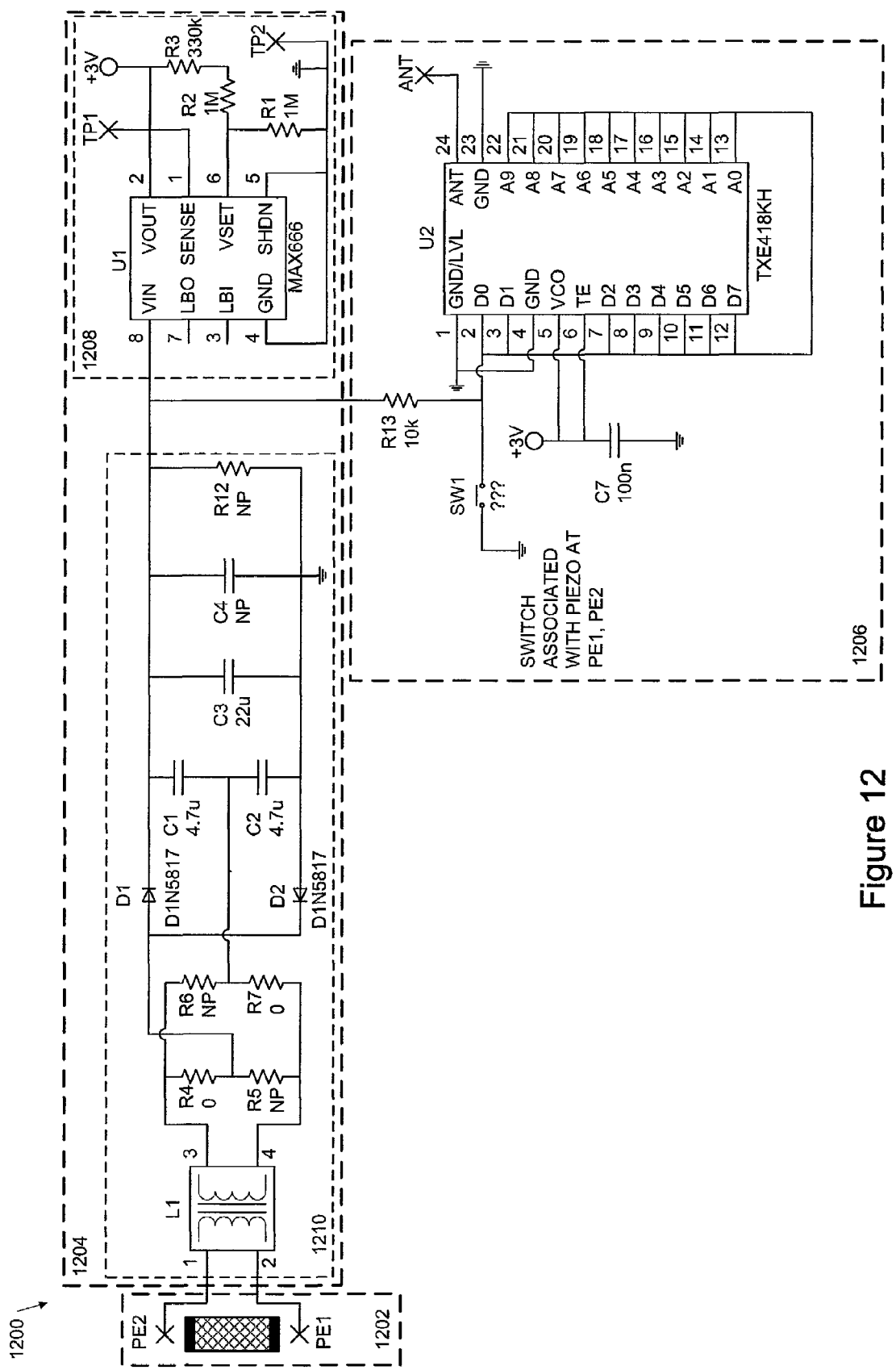
FIG. 12 is a schematic of a self-powered sensor.

FIG. 12 is a schematic of a self-powered sensor 1200. The sensor 1200 converts one form of energy (mechanical pressure) into another form of energy (radio frequency). The sensor 1200 includes a power generator 1202, a power conditioning unit 1204, and a transcoder 1206. In FIG. 12, the power generator 1202 comprises a piezoelectric ceramic or element that may generate a brief high voltage and low current transient electrical output when subject to a mechanical pressure. The power generator 1202 is electrically connected to the power conditioning unit 1204. In FIG. 12, the power conditioning unit 1204 includes discrete passive and active electrical elements 1210 and a voltage regulator 1208. In some systems, the elements 1210 may comprise discrete passive and/or active circuit components or may comprise integrated electrical components.

The circuit elements 1210 process the transient output of the power generator 1202 through rectification and smoothing. In FIG. 12, the voltage regulator 1208 comprises an integrated element but in some other systems may comprise discrete passive and/or active electrical elements. Despite variations in the conditioned voltage from the circuit elements 1210, the voltage regulator 1208 may source a substantially constant voltage to the transcoder 1206. In FIG. 12, the transcoder 1206 comprises an encryption unit and a radio frequency transmitter integrated in a unitary device. In alternate systems, the encryption unit and transmitter may be separate elements. When a source voltage is supplied to the transcoder 1206, a message is encrypted and transmitted as a radio frequency signal.

Figure 13:
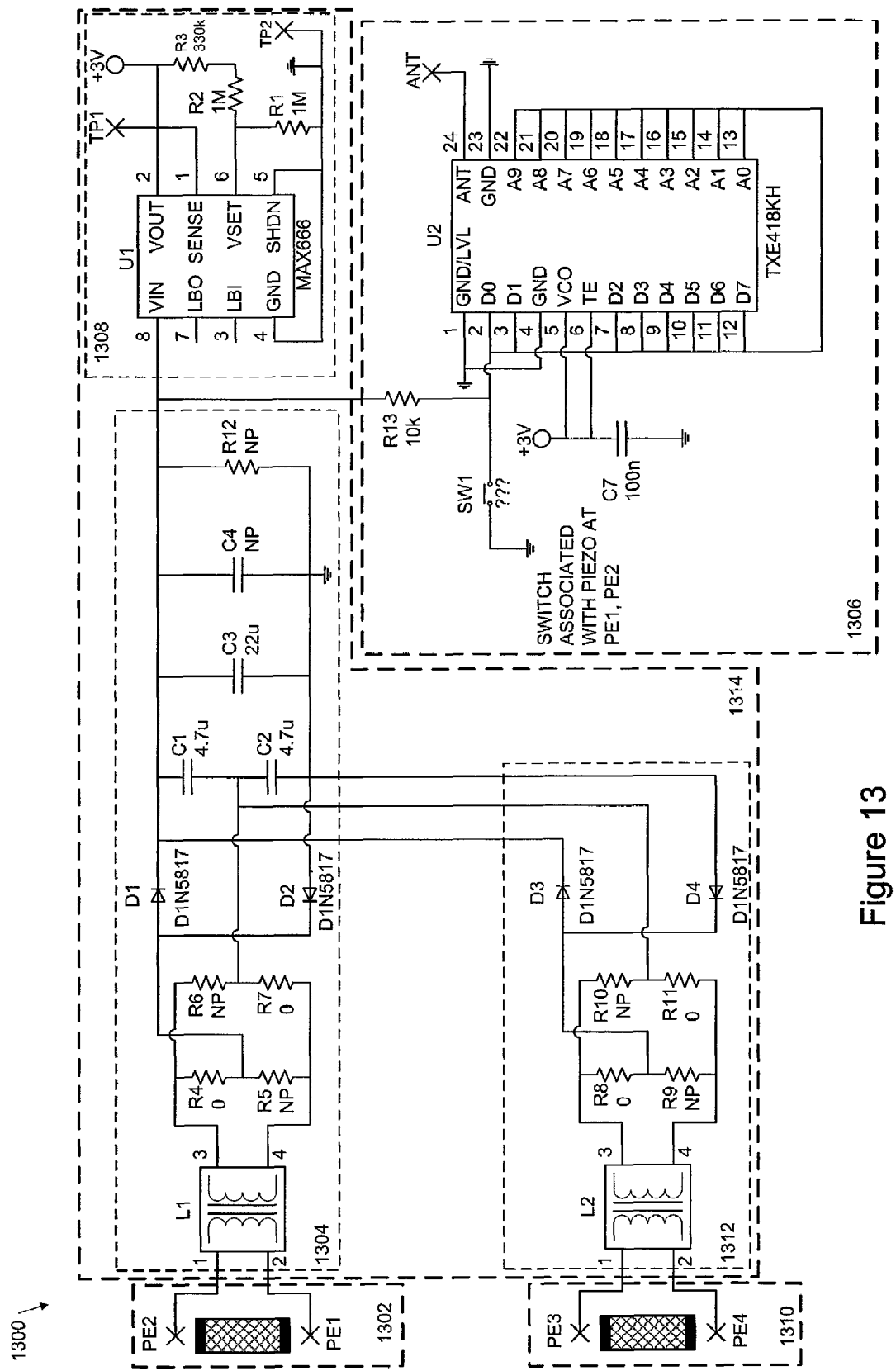
FIG. 13 is an alternative schematic of a self-powered sensor.

FIG. 13 is a schematic of an alternative self-powered sensor 1300. The sensor 1300 includes power generators 1302 and 1310, a power conditioning unit 1314, and a transcoder 1306. Either one or both of the power generators 1302 and 1310 may convert a mechanical pressure into a high voltage and low current transient electrical output. In FIG. 13, the power conditioning unit 1314 includes discrete passive and active electrical elements 1304 and 1312 and a voltage regulator 1308. The power generators 1302 and 1310 are electrically connected to elements 1304 and 1312, respectively. In some systems, the elements 1304 and 1312 may comprise a unitary component. The elements 1304 and 1312 convert the transient output of the power generators 1302 and 1310 into a conditioned voltage source for the voltage regulator 1308. Despite variations in the conditioned voltage, the voltage regulator 1308 may source a substantially constant or momentary voltage to the transcoder 1306. In FIG. 13, an encryption unit and a radio frequency transmitter that make up the transcoder 1306 comprise a unitary device. The encryption unit may comprise a code-hopping encoder that may change a transmitted code word with some or every transmission. When a source voltage is supplied to the transcoder 1306, a message is encrypted and transmitted as a radio frequency signal.

Figure 14:
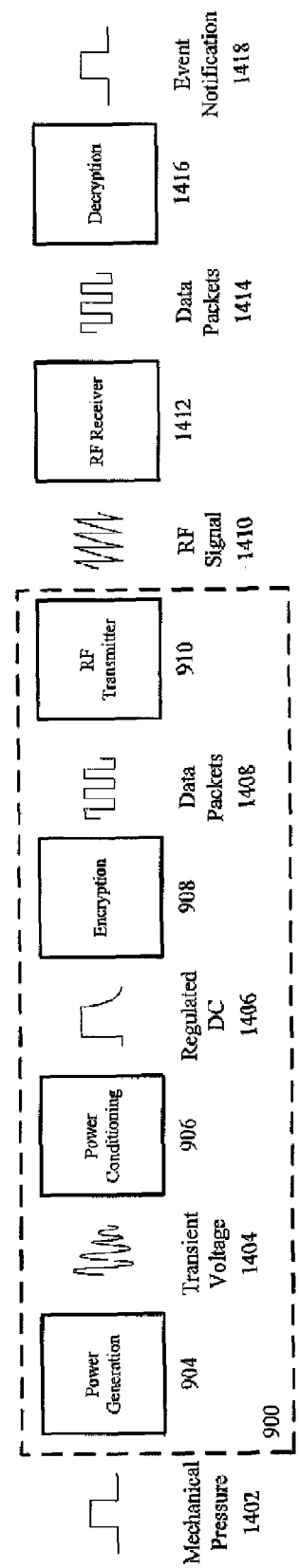
FIG. 14 is a block diagram of the self-powered sensor communicating a single event.

FIG. 14 is a block diagram of the self-powered sensor 900 communicating a single event to a receiver 1412. A mechanical pressure or bias 1402 may be applied to a power generation unit 904 which generates a voltage and current 1404. The power conditioning unit 906 converts the output 1404 to a regulated direct current 1406. The regulated direct current 1406 may source an optional encryption unit 908 and/or a radio frequency transmitter 910. The encryption unit 908 may encode a message communicating the single event (e.g., sensed by the mechanical pressure 1402) into fixed or variable data packets 1408 for transmission by the transmitter 910. A radio frequency signal 1410 received by a radio frequency receiver 1412 is converted into data packets 1414. The data packets 1414 may be communicated to the optional decryption unit 1416 to restore the data to its original form. The decryption unit 1416 may decode, process, and/or validate the data packets into an event notification signal 1418. The signal 1418 may be adapted to determine what has been identified or requested. The event notification signal 1418 may be transmitted over a vehicle data bus to electronic control units within a vehicle. The encryption unit 908 and/or transmitter 910 may comprise a microcontroller, microprocessor, application specific integrated circuit, discrete circuitry, or a combination of other types of circuitry or logic.

Figure 15:
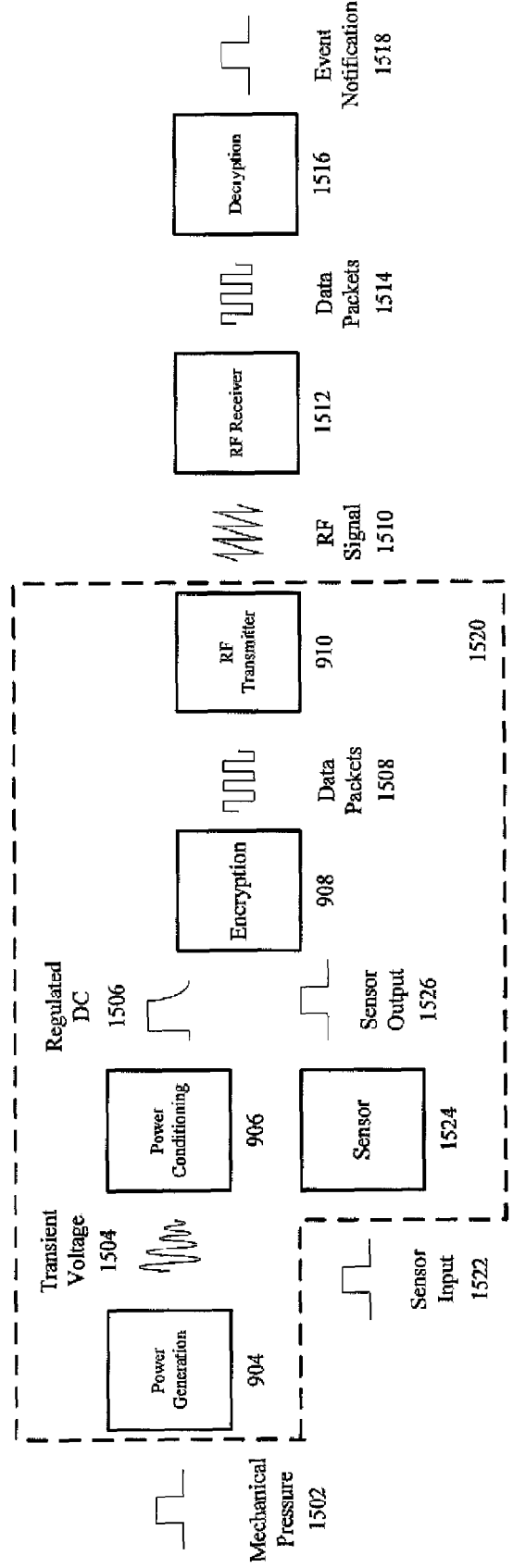
FIG. 15 is a block diagram of a self-powered sensor communicating multiple events.

FIG. 15 is a block diagram of a self-powered sensor 1520 communicating multiple events to a receiver 1512. A sensor 1524 may sense an event and generate an output 1526 to be encrypted and transmitted. A mechanical pressure 1502 may be applied to the power generation unit 904 that generates a voltage and current 1504. The power conditioning unit 906 converts the output 1504 to a regulated direct current 1506. The direct current 1506 may source an encryption unit 908, a radio frequency transmitter 910, and/or the sensor 1524. The sensor 1524 may comprise a unitary part of the encryption unit 908 and/or radio frequency transmitter 910 or may be a separate device. The sensor 1524 may detect different conditions by sensing changes in one, two, or more energy levels.

Prior to, at about the same time, or after the application of mechanical pressure 1502, an input 1522 into the sensor 1524 may occur. The sensor 1524 generates an output 1526 that may be sensed by the encryption unit 908. The encryption unit 908 may encode a message communicating one, two, or more events (e.g., in FIG. 15, conditions sensed by the mechanical pressure 1502 and the sensor input 1522) into data packets 1508 for transmission by the transmitter 910. A radio frequency signal 1510 may be received by a radio frequency receiver 1512. The receiver 1512 converts the signal 1510 into fixed or variable data packets 1514 that may be communicated to a decryption unit 1516. The decryption unit 1516 may decipher, process, and/or validate the data packets into an event notification signal 1518. The receiver 1512 and decryption unit 1516 may comprise a unitary device or may be comprised of separate components. The receiver 1512 may comprise a Remote Keyless Entry ("RKE") Receiver that enables or disables features within a vehicle or may comprise a remote receiver that facilitates other wireless communications.

Figure 16:
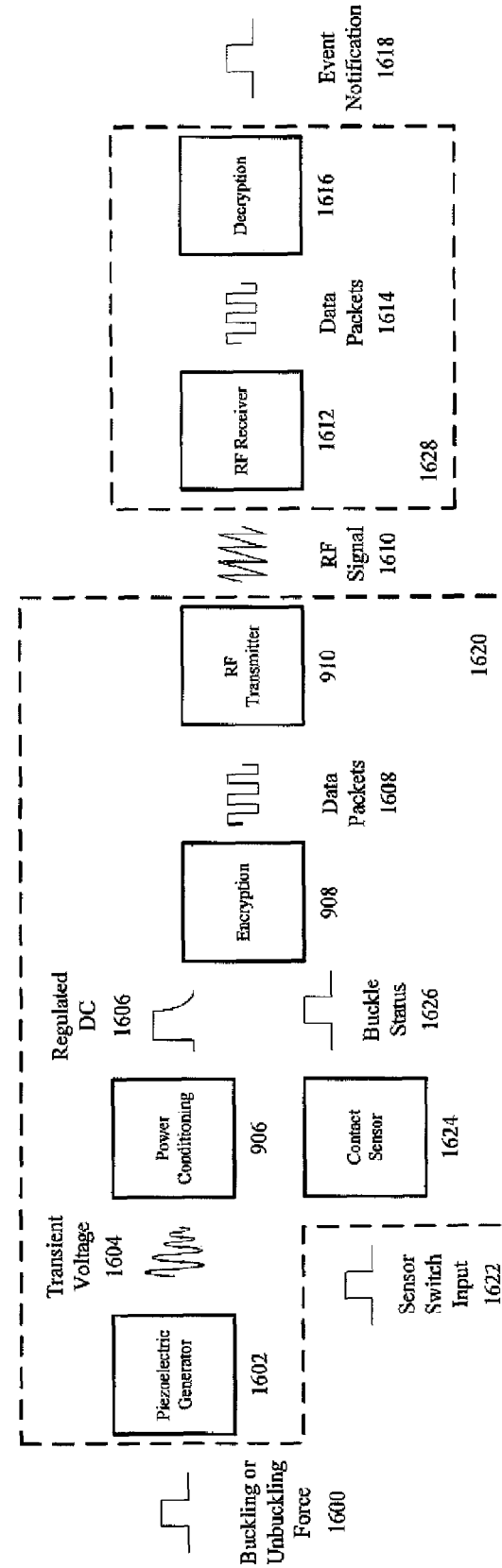
FIG. 16 is a block diagram of a self-powered sensor communicating a safety belt buckle status.

FIG. 16 is a block diagram of a self-powered sensor 1620 communicating a safety belt buckle status. The sensor 1620 communicates a buckle status of a safety belt buckle to a receiver within a vehicle, such as a RKE Receiver 1628. The sensor 1620 may utilize a mechanical pressure 1600 generated upon a buckling or unbuckling of a safety belt to source a transmitter 910 and transmit a message indicating a buckle status. In FIG. 16, the mechanical pressure 1600 generated upon the buckling or unbuckling of the safety belt may be applied to a piezoelectric generator 1602. The piezoelectric generator 1602 may generate a voltage and/or current output 1604. The transient output 1604 may be rectified and stored in the power conditioning unit 906. The power conditioning unit 906 may source a direct current voltage 1606 to an encryption unit 908, a radio frequency transmitter 910, and/or a contact sensor 1624.

Prior to, at about the same time, or after the application of the mechanical pressure 1600, the contact sensor 1624 may detect the buckling or unbuckling of the safety belt by a sensor switch input 1622. The contact sensor 1624 may generate a secondary buckle status signal 1626. The encryption unit 908 may encode a message communicating the buckle status into data packets 1608 for transmission by the transmitter 910. In FIG. 16, a radio frequency signal 1610 may be received by the RKE Receiver 1628. The RKE Receiver 1628 may comprise a radio frequency receiver 1612 and a decryption unit 1616. A receiver element 1612 converts the signal 1610 into data 1614 that may be communicated to the optional decryption unit 1616. The decryption unit 1616 may decode, process, and/or validate the data packets into an event notification 1618. The event notification 1618 may be used to notify vehicle occupants of the buckle status of the safety belt through audio, visual, and/or tactile reminders, e.g., by an indicator light on the instrument panel, by a repetitive chiming noise, or other reminders. The signal 1618 may be transmitted wirelessly or over a vehicle data bus to electronic control units within a vehicle.

Figure 17:
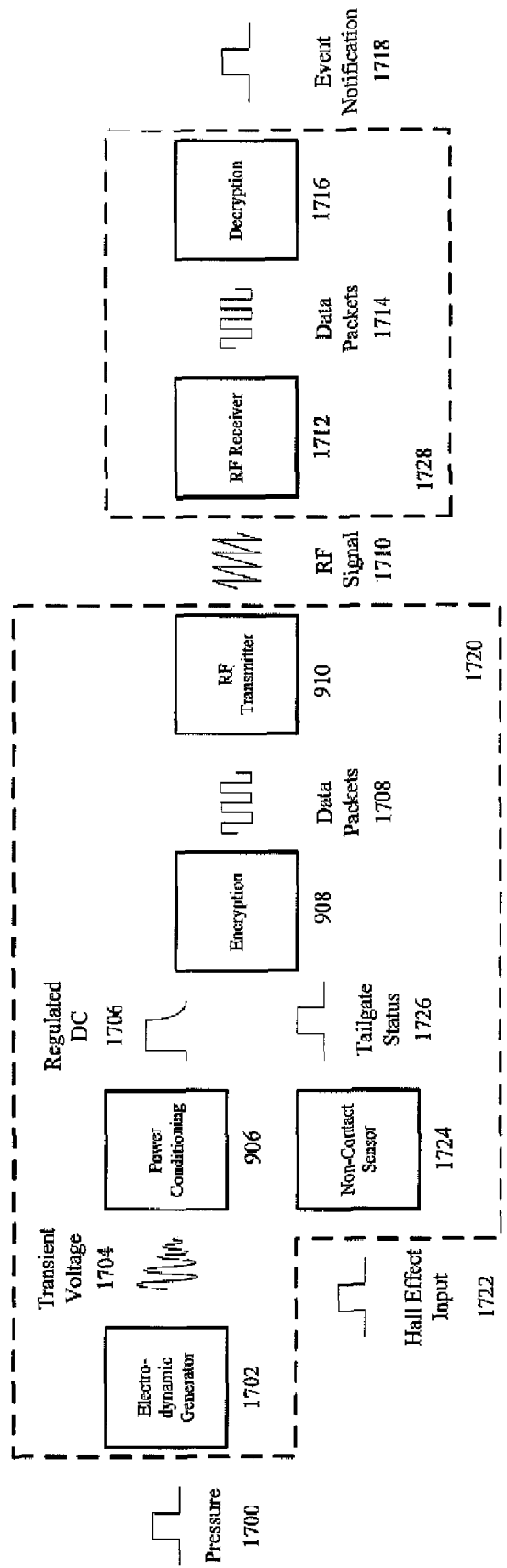
FIG. 17 is a block diagram of a self-powered sensor communicating a tailgate status.

FIG. 17 is a block diagram of a self-powered sensor 1720 communicating a door status, such as a tailgate status. The sensor 1720 communicates a status (e.g., up or down, open or closed, etc.) to a receiver within a vehicle, such as a RKE Receiver 1728, The sensor 1720 may utilize a magnetic or mechanical pressure 1700 to source a transmitter 910 and transmit a message indicating the status. In a non-mechanical application, a voltage and current 1704 may be induced by an electro-dynamic generator 1702 or other generator. The transient output 1704 may be rectified and stored in the power conditioning unit 906. The power conditioning unit 906 may supply a regulated direct current voltage 1706 to an encryption unit 908, a radio frequency transmitter 910, and/or a non-contact sensor 1724.

In FIG. 17, a non-contact sensor 1724 may detect a condition of a tailgate by a Hall Effect input 1722. The non-contact sensor 1724 generates a tailgate status signal 1726. The optional encryption unit 908 may encode a message communicating the tailgate status into data 1708 for transmission by the transmitter 910. In FIG. 17, a radio frequency signal 1710 may be received by the RKE Receiver 1728. A receiver 1712 converts the signal 1710 into data 1714 that may be communicated to the optional decryption unit 1716. The decryption unit 1716 may decode, process, and/or validate the data packets into an event notification signal 1718, which may be used to notify vehicle occupants of the tailgate status.

Figure 18:
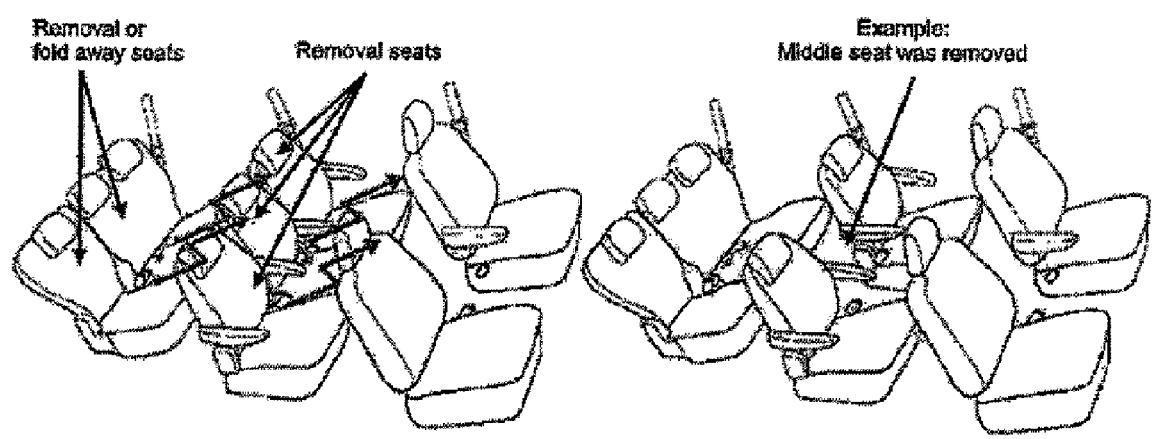
FIG. 18 shows removable and foldaway seats coupled to self-powered sensors.

FIG. 18 shows removable and foldaway seats coupled to self-powered sensors. Seats in a vehicle may be removed or folded away to create more space or if the seats are not needed without manually disconnecting any wiring. A self-powered sensor may be coupled to each removable or foldaway seat to indicate safety belt buckle status to vehicle occupants. A unique identification code may be assigned to each self-powered sensor on a removable or foldaway seat to individually identify the buckle status of the particular seat. In FIG. 18, if the middle seat of the middle row of seats has been removed, the buckle status of the remaining seats may still be detected and transmitted by their respective self-powered sensor.

Figure 19:
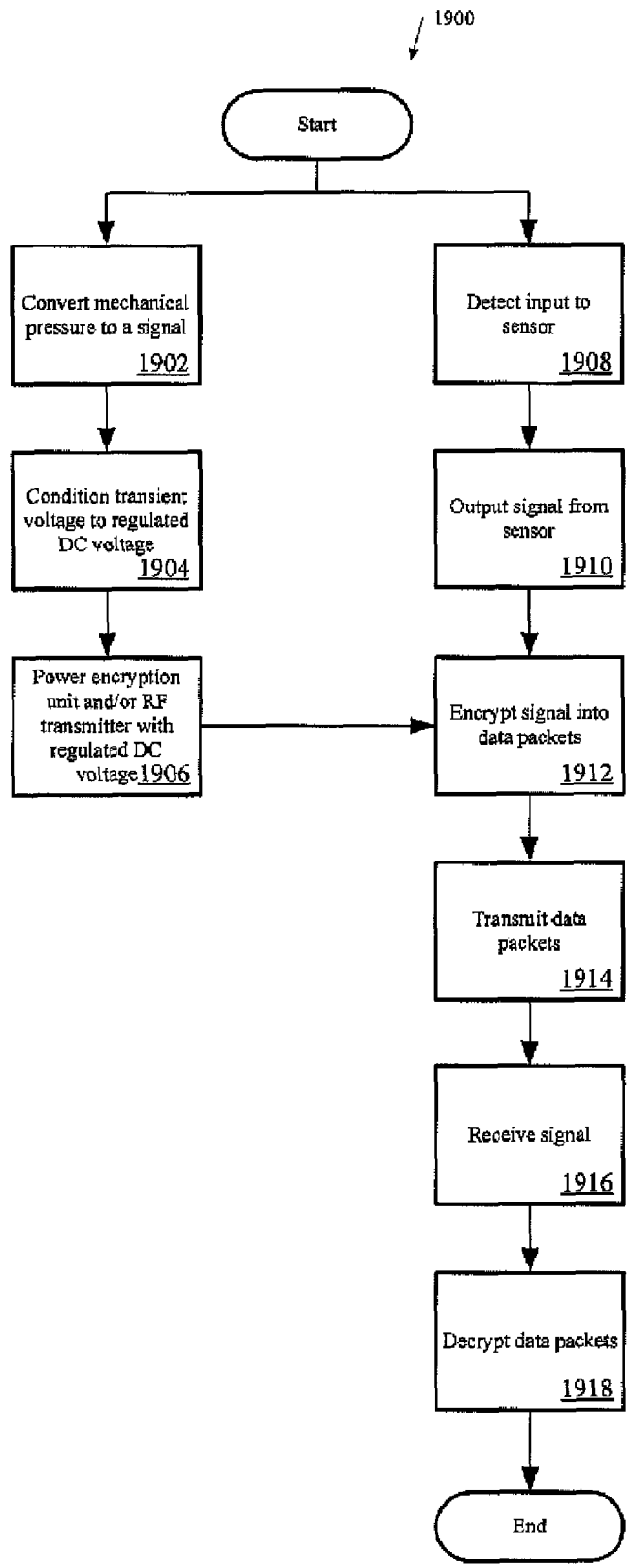
FIG. 19 is a process in which a self-powered sensor transmits an encrypted signal.

FIG. 19 is a process 1900 in which a self-powered sensor transmits an encrypted signal. A mechanical pressure 1502 may be converted to an analog signal 1504 (Act 1902). The signal 1504 may be conditioned to a substantially constant voltage 1506 (Act 1904). The voltage 1506 may power an encryption unit 908 and/or radio frequency transmitter 910 (Act 1906). A sensor 1524 may detect an input 1522 of an event (Act 1908). The sensor 1524 may generate an output 1526 identifying the event (Act 1910). The encryption unit 908, sourced by the regulated voltage 1506 in Act 906, may encrypt the output of the sensor into fixed or variable data packets 1508 (Act 1912). The data packets 1508 may be transmitted to a receiver (Act 1914). A receiver may receive the incoming signals (Act 1916) and the data packets may be decrypted into an event notification signal 1518 for use in the system (Act 1918). The system may determine what has been identified or requested.

Figure 20:
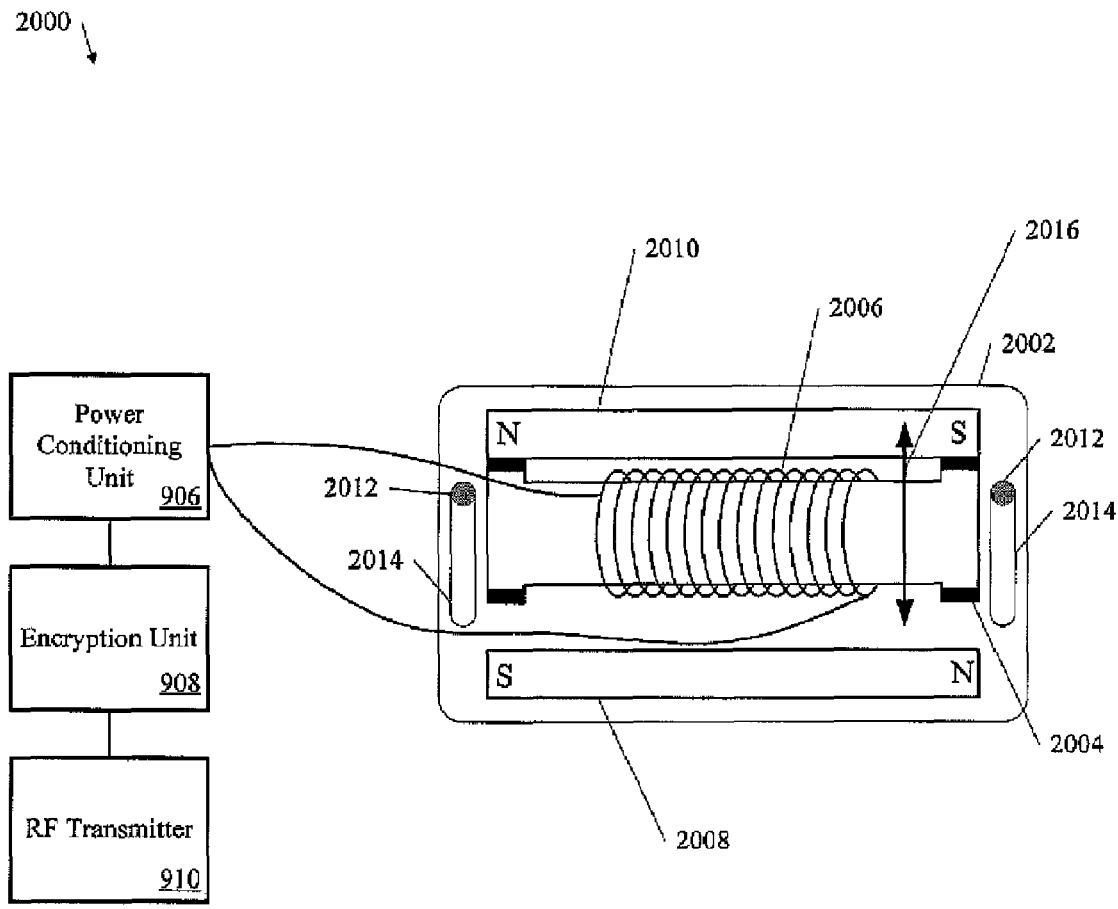
FIG. 20 is a self-powered sensor including an electro-dynamic generator.

FIG. 20 is a self-powered sensor 2000. The sensor 2000 comprises an electro-dynamic generator 2002, a power conditioning unit 906, an encryption unit 908, and a radio frequency transmitter 910. The electro-dynamic generator 2002 may generate an electrical signal in response to a detected change in a magnetic field direction that may occur with an event. The electrical signal may be converted into a substantially constant voltage by the power conditioning unit 906. The encryption unit 908 and radio frequency transmitter 910 may be sourced by the substantially constant voltage to encode a unique message.

The electro-dynamic generator 2002 includes a core 2004, a wire coil 2006, a first magnet 2008 with a first magnetic polarity, and a second magnet 2010 with a second magnetic polarity. The second magnetic polarity may be positioned substantially opposite to the first magnetic polarity. An event may change the magnetic field direction in the core 2004 and the wire coil 2006. For example, prior to an event, the core 2004 and wire coil 2006 may be in a first position, such that the core 2004 is in contact with the first magnet 2008. In the first position, an electrical signal is not generated because the direction of the magnetic field and the direction of the magnetic flux are not changing. An event may cause a substantially planar movement of the core 2004 and wire coil 2006 in a direction 2016 to a second actuated position. In FIG. 20, the core 2004 is in contact with the second magnet 2010 in the second actuated position. In this position, the second magnetic polarity is substantially opposite to the first magnetic polarity of the first magnet 2008. There is a change in direction of the magnetic flux and the magnetic field in the core 2004 that may induce an electrical signal in the wire coil 2006. Similarly, an electrical signal may be induced in the wire coil 2006 when an event causes a substantially planar movement of the core 2004 from the second actuated position to the first position. In FIG. 20, an event may be an engagement or a release of a belt buckle, an opening or a closing of a door, an engagement of a switch controlling a movement of a power window, or another event.

The core 2004 may be comprised of metal or another material that may conduct a magnetic flux. The wire coil 2006 may be comprised of copper or other materials, and may be wrapped around the core 2004. The core 2004 may be attached to pins 2012 that travel in slots 2014. When an event causes a substantially planar movement of the core 2004 from the first position to the second actuated position, the pins 2012 may move with the core 2004. As the pins 2012 approach the end of the slots 2014, the core 2004 may break free from the first magnet 2008 and may be attracted to the second magnet 2010. The movement induces an electrical signal in the wire coil 2006. When an event causes a substantially planar movement of the core 2004 from the second actuated position to the first position, the pins 2012 may move with the core 2004. This movement may also induce an electrical signal in the wire coil 2006.

Figure 21:
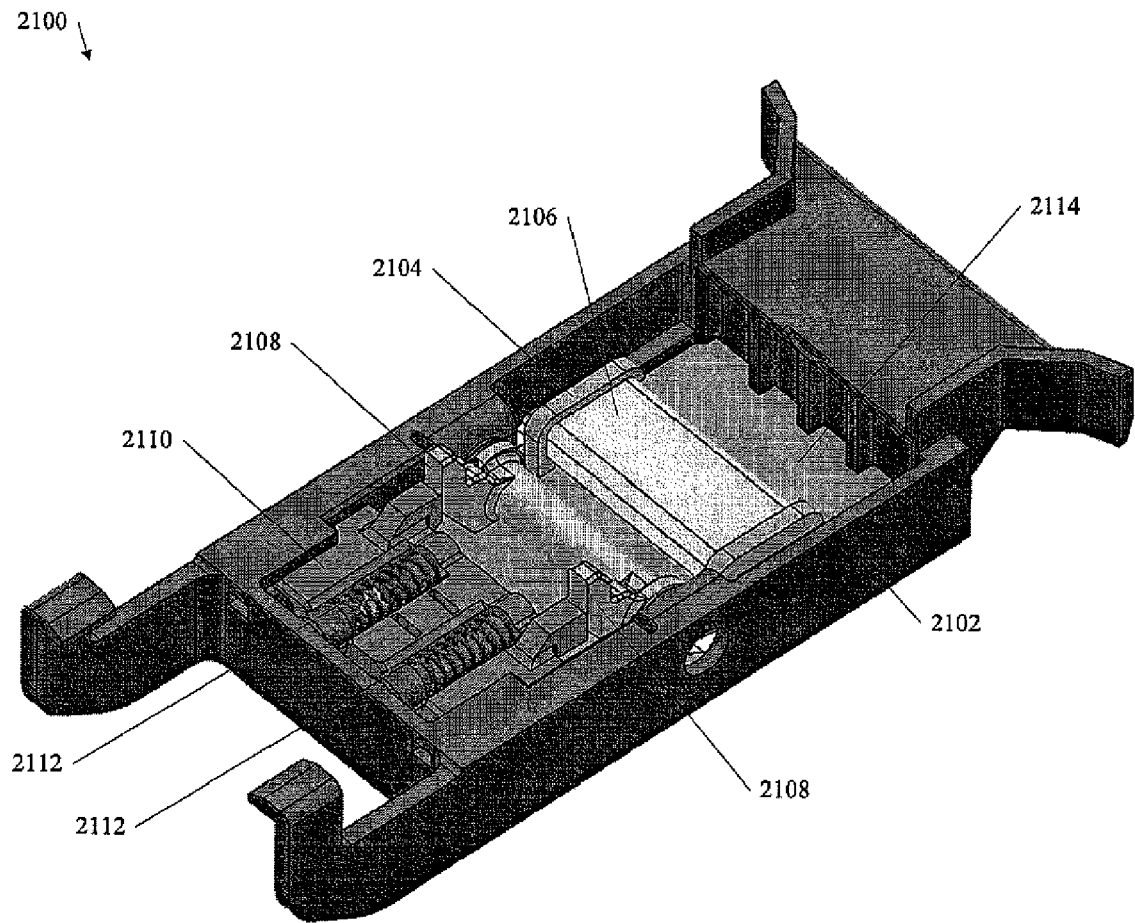
FIG. 21 is a top perspective view of a belt buckle including an electro-dynamic generator.

FIG. 21 is a top perspective view of a belt buckle 2100 that includes an electro-dynamic generator. The belt buckle 2100 may generate an electrical signal in response to an engagement or a release of the belt buckle. The electrical signal may be conditioned into a substantially constant voltage by power conditioning circuitry on a printed circuit board 2114. The voltage may source encryption circuitry to encode a unique message in a data packet. The data packet may then be transmitted by a radio frequency transmitter.

The bobbin 2104 may be comprised of plastic or another non-conducting material. The wire coil 2106 may be comprised of copper or another medium that conducts electricity, and may be wrapped around the bobbin 2104. An engagement or release of a belt buckle may change the magnetic field direction in the wire coil 2106. In FIG. 21, the bobbin 2104 and the wire coil 2106 are substantially fixed. The pivots 2108 and the actuator 2110 may move when the belt buckle is engaged or released. Because the actuator 2110 includes first and second magnets (not shown) positioned such that their respective magnetic polarities are substantially opposite, the magnetic field direction in the wire coil 2106 may change.

The change in direction of the magnetic flux and the magnetic field in the wire coil 2106 may induce an electrical signal in the wire coil 2106. For example, when the belt buckle is engaged, the pivots 2108 and the actuator 2110 move in a plane. When the belt buckle is released, the return springs 2112 may bias the pivots 2108 and the actuator 2110 to their original position. An electrical signal may be induced in the wire coil 2106 when the belt buckle is released.

Figure 22:
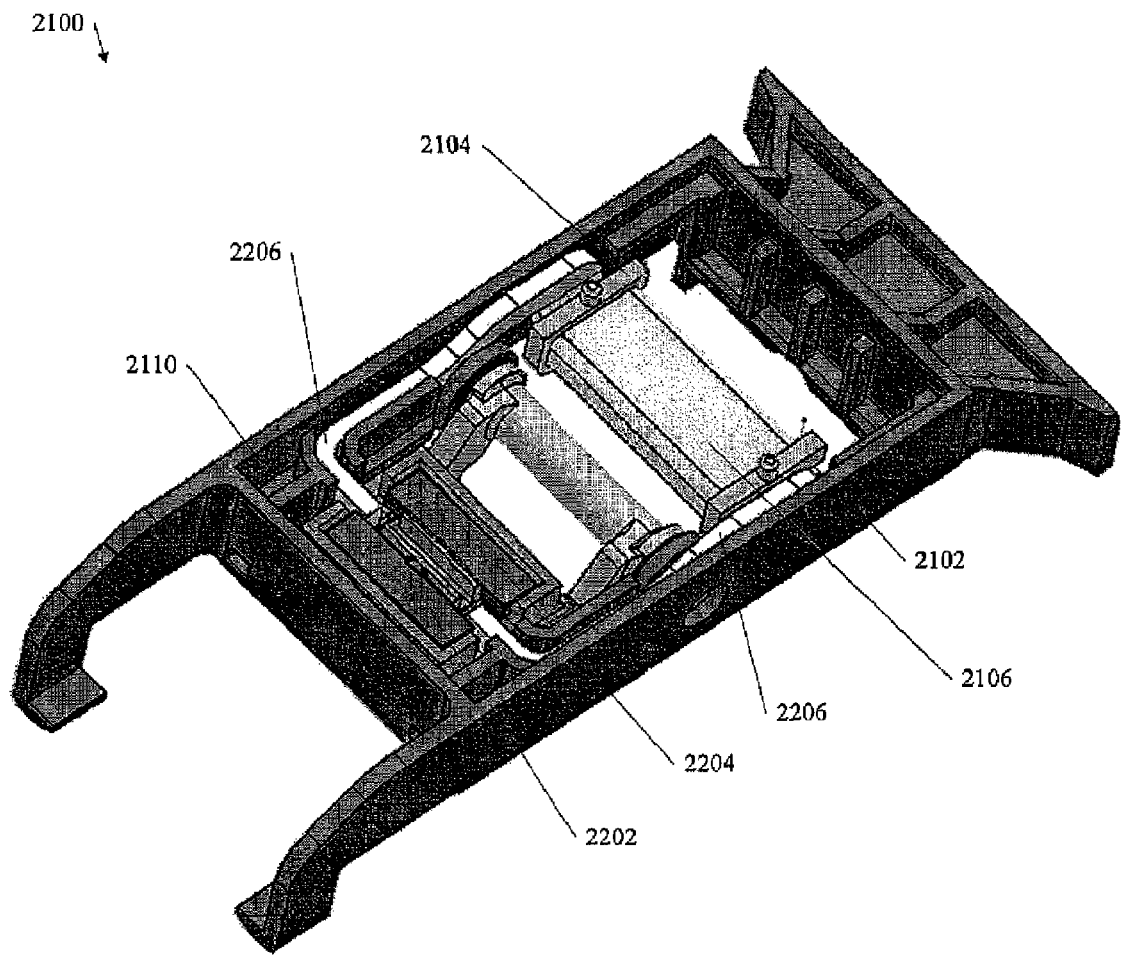
FIG. 22 is a bottom perspective view of the belt buckle of FIG. 21.

FIG. 22 is a bottom perspective view of the belt buckle 2100 of FIG. 21. The belt buckle 2100 in FIG. 22 includes the frame 2102 that supports a first magnet 2202. The first magnet 2202 has a first magnetic polarity and a second magnet 2204 has a second magnetic polarity. The second magnetic polarity is positioned substantially opposite to the first magnetic polarity. A flux bar 2206 that may carry magnetic flux is coupled to a bobbin 2104 and the wire coil 2106. In FIG. 22, the flux bar 2206 is fixed. The actuator 2110, the first magnet 2202, and the second magnet 2204 may move when the belt buckle is engaged or released. The movement causes changes in the magnetic field direction in the flux bar 2206 and the wire coil 2106.

Prior to the engagement of the belt buckle, the actuator 2110 may be in a first position, and the flux bar 2206 is in contact with the first magnet 2202. In the first position, an electrical signal is not generated because the direction of the magnetic field and magnetic flux are not changing. The engagement of the belt buckle may cause a substantially planar movement of the pivots 2108 and the actuator 2110 to a second actuated position. In that position, the flux bar 2206 is in contact with the second magnet 2204. The second magnetic polarity is substantially opposite to the first magnetic polarity of the first magnet 2202. There is a change in direction of the magnetic flux and the magnetic field in the flux bar 2206 that may induce an electrical signal in the wire coil 2106. Similarly, an electrical signal may be induced in the wire coil 2106 when the belt buckle is released, causing a substantially planar movement of the pivots 2108 and the actuator 2110 from the second actuated position to the first position.

Figure 23:
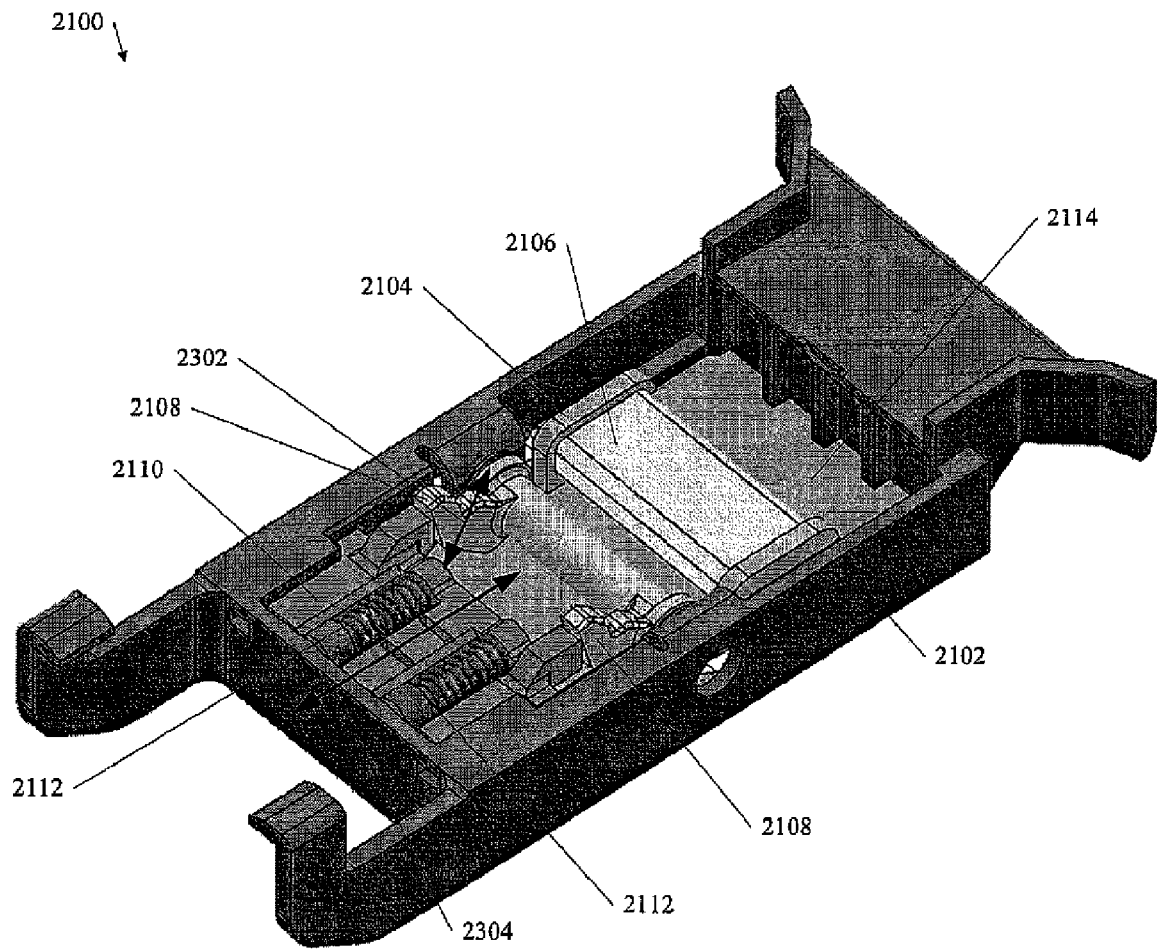
FIG. 23 is a top perspective view of the belt buckle of FIG. 21 in an actuated position.

FIG. 23 is a top perspective view of the belt buckle 2100 of FIG. 21 in a second actuated position. The belt buckle 2100 in FIG. 23 shows the pivots 2108 and the actuator 2110 in the second actuated position instead of the first position shown in FIG. 21. The pivots 2108 and the actuator 2110 may move in the directions 2302 and 2304, respectively, when the belt buckle is engaged or released. The engagement or release of the belt buckle may change the magnetic field direction in the wire coil 2106. In the second actuated position, the actuator 2110 has moved such that the flux bar 2206 (not shown) is in contact with the second magnet 2204. The magnetic polarity of the second magnet 2204 is substantially opposite of the magnetic polarity of the first magnet 2202. The magnetic field direction in the flux bar 2206 and the wire coil 2106 may change and induce an electrical signal. When the belt buckle is released, the return springs 2112 may bias the pivots 2108 and the actuator 2110 to the first position.

The electrical signal induced in the wire coil 2106 may be conditioned into a substantially constant voltage by power conditioning circuitry. The substantially constant voltage may source encryption circuitry to encode a unique message in a data packet. The data packet may then be transmitted by a radio frequency transmitter. The unique message in the data packet may signify a status of the belt buckle 2100. For example, the unique message may indicate if the belt buckle 2100 is engaged, released, in an error condition, or another state. There may be an error condition if the belt buckle 2100 is partially engaged or released, or if another error is detected.

The power conditioning circuitry may include an energy storage device to accumulate and store the induced electrical signals. The energy storage device may include an electric circuit element that temporarily stores charge, a battery, or other energy storage device. The energy storage device may continuously source the encryption circuitry and radio frequency transmitter if the belt buckle 2100 is in an error condition, for example. In this case, the data packet including the unique message signifying the error condition may be continuously transmitted by the radio frequency transmitter. Alternately, the status of the belt buckle 2100 may be associated with a change in direction of a current of the induced electrical signal, instead of storing a status of the belt buckle 2100. For example, the direction of the current may change when the direction of the magnetic flux and magnetic field changes. The direction of the current may signify the engagement or release of the belt buckle 2100, and be used to indicate the status of the belt buckle 2100.

Figure 24:
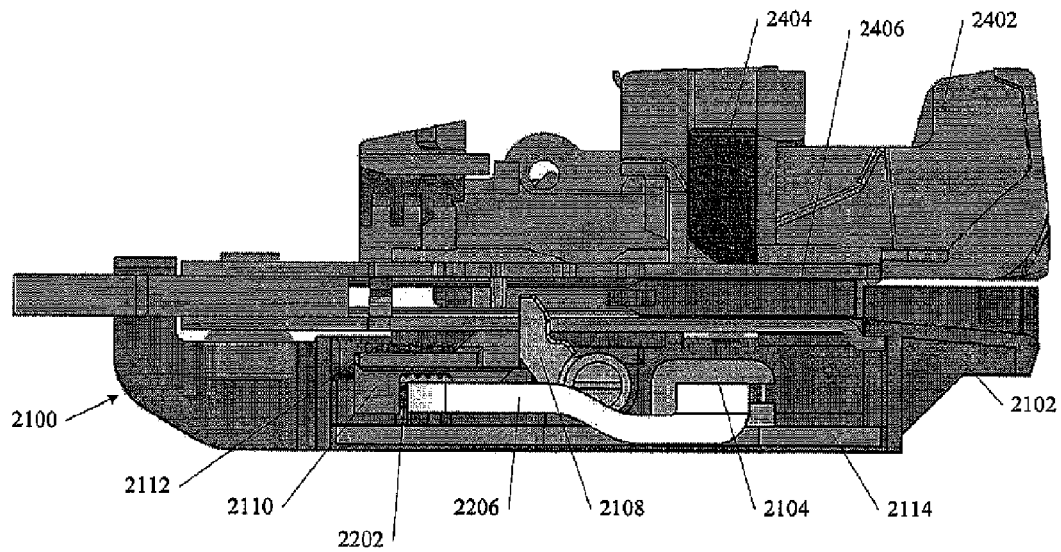
FIG. 24 is a cross section of the belt buckle of FIG. 21.

FIG. 24 is a cross section of the belt buckle 2100 of FIG. 21 in the first position. In this cross section view, the second magnet 2204 (not shown) is positioned behind the flux bar 2206, and may move with the actuator 2110 when the belt buckle is engaged or released. The belt buckle 2100 in FIG. 24 also includes a buckle receptacle 2402 that comprises a first member 2404 and a second member 2406. The buckle receptacle 2402 may receive a male end of the belt buckle. The first and second members 2404 and 2406 may move other parts of the belt buckle 2100 when generating an electrical signal in response to an engagement or a release of the belt buckle. Other components may be included in the buckle receptacle 2402.

An engagement or release of a belt buckle may change the magnetic field direction in the flux bar 2206 and the wire coil 2106. The flux bar 2206, the bobbin 2104, and the wire coil 2106 are substantially fixed. The pivots 2108 and the actuator 2110 may move when the belt buckle is engaged or released. Prior to an engagement of the belt buckle, the actuator 2110 may be in a first position, such that the flux bar 2206 is in contact with the first magnet 2202. In the first position, an electrical signal is not generated because the direction of the magnetic field and magnetic flux are not changing. The engagement of the belt buckle may actuate the first member 2404 of the buckle receptacle 2402. The actuation of the first member 2404 may in turn actuate the second member 2406. The second member 2406 may cause a substantially planar movement of the pivots 2108 and the actuator 2110 to a second actuated position. In the second actuated position, the flux bar 2206 is in contact with the second magnet 2204. There is a change in direction of the magnetic flux and the magnetic field in the flux bar 2206 that may induce an electrical signal in the wire coil 2106.

Figure 25:
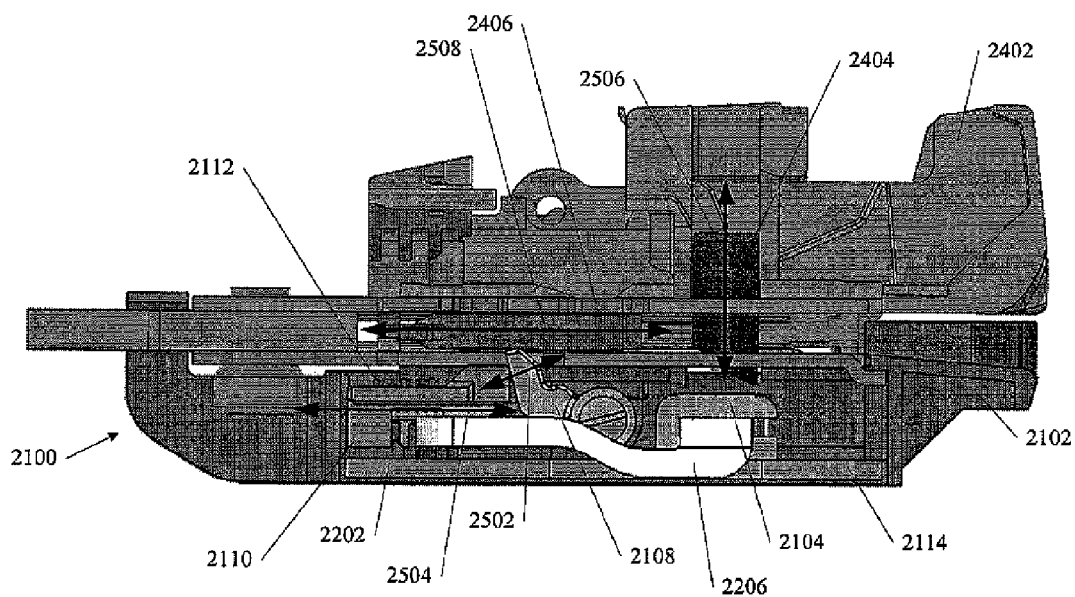
FIG. 25 is a cross section of the belt buckle of FIG. 21 in an actuated position.

FIG. 25 is a cross section of the belt buckle 2100 of FIG. 21 in the second actuated position. The belt buckle 2100 in FIG. 25 shows the pivots 2108, the actuator 2110, the first member 2404, and the second member 2406 in the second actuated position instead of the first position. The pivots 2108 and the actuator 2110 may move in the directions 2502 and 2504, respectively, when the belt buckle is engaged or released. In addition, the first member 2404 and the second member 2406 may move in the directions 2506 and 2508, respectively, when the belt buckle is engaged or released. The engagement or release of the belt buckle may change the magnetic field direction in the flux bar 2206 and the wire coil 2106. In the second actuated position, the actuator 2110 has moved such that the flux bar 2206 is in contact with the second magnet 2204 (not shown). The magnetic polarity of the second magnet 2204 is substantially opposite of the magnetic polarity of the first magnet 2202. The magnetic field direction in the flux bar 2206 and the wire coil 2106 may change and induce an electrical signal. When the belt buckle is released, the return springs 2112 may bias the pivots 2108, the actuator 2110, the first member 2404, and the second member 2406 to the first position.

Figure 26:
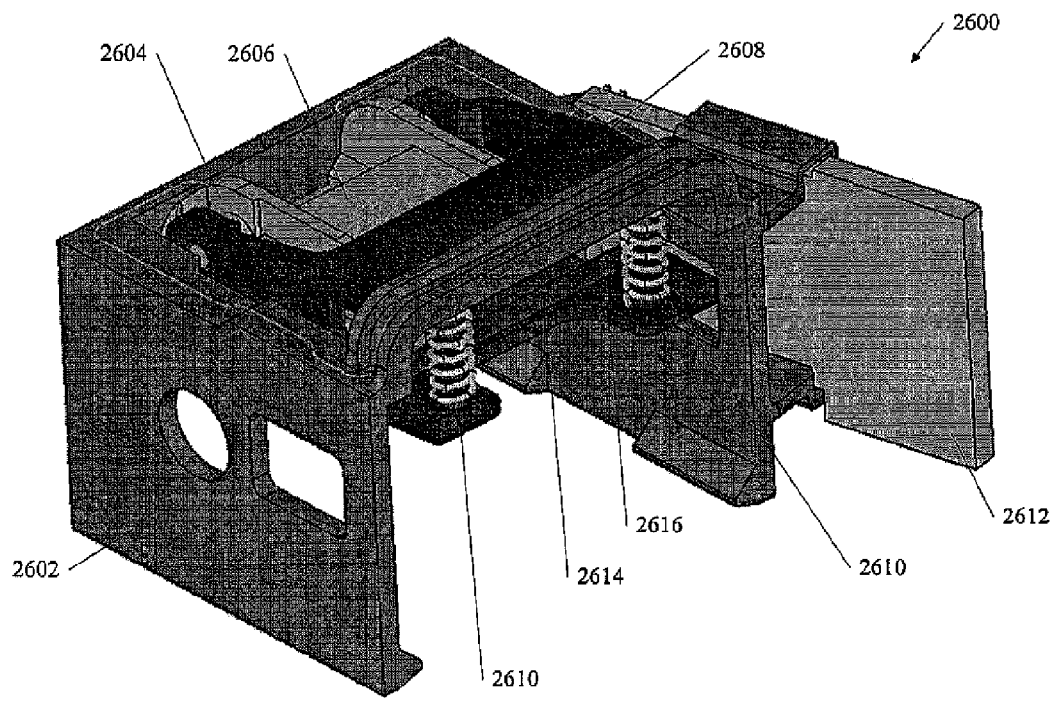
FIG. 26 is a perspective view of an alternative belt buckle including an electro-dynamic generator.

FIG. 26 is a perspective view of an alternative belt buckle 2600 including an electro-dynamic generator. The belt buckle 2600 may generate an electrical signal in response to an engagement or a release of the belt buckle. The electrical signal may be conditioned into a substantially constant voltage by power conditioning circuitry on a non-conductive board supporting signal pathways 2612. The voltage may source encryption circuitry to encode a unique message in a data packet. The data packet may be transmitted by a radio frequency transmitter. A frame 2602 may support a carrier 2604 with a wire coil 2606. An actuator 2608 may be coupled with the carrier 2604, and may include a first magnet 2614, a second magnet (not shown), and a flux bar 2616.

The flux bar 2616 may be comprised of a conductor that may conduct a magnetic flux. The wire coil 2606 may be comprised of copper or another medium that conducts electricity, and may be wrapped around the carrier 2604. The first magnet 2614 has a first magnetic polarity and the second magnet has a second magnetic polarity. The second magnetic polarity is substantially opposite to the first magnetic polarity. In FIG. 26, the flux bar 2616 is substantially fixed and the actuator 2608, the first magnet 2614, and the second magnet may move in a plane when the belt buckle is engaged or released. The movement causes changes in the magnetic field direction in the flux bar 2616 and the wire coil 2606. The change in the magnetic field direction may induce an electrical signal in the wire coil 2606. When the belt buckle is released, the return springs 2610 may bias the actuator 2608, the first magnet 2614, and the second magnet to their original position. An electrical signal may be induced in the wire coil 2606 when the belt buckle is released.

Figure 27:
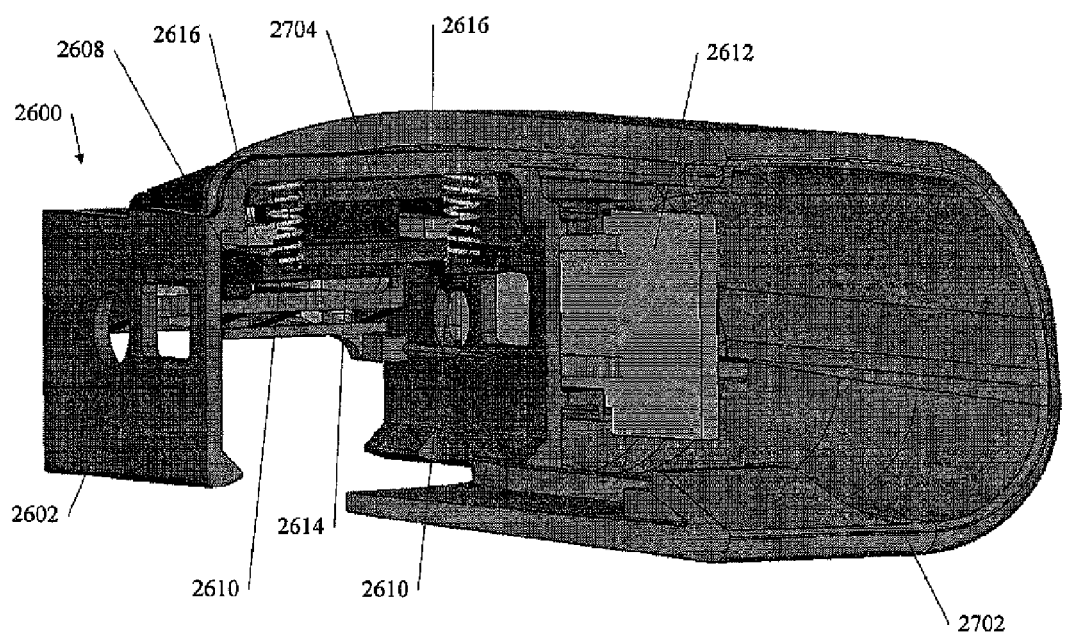
FIG. 27 is a perspective view of the alternative belt buckle of FIG. 26 including a cutaway view of a buckle housing.

FIG. 27 is a perspective view of the alternative belt buckle 2600 of FIG. 26 including a cutaway view of a buckle housing 2702. Prior to the engagement of the belt buckle, the actuator 2608 may be in a first position, and the flux bar 2616 is in contact with the first magnet 2614. In the first position, an electrical signal is not generated because the direction of the magnetic field and magnetic flux are not changing. The engagement of the belt buckle may cause a substantially planar movement of the actuator 2608 to a second actuated position. In that position, the flux bar 2616 is in contact with the second magnet 2704. The second magnetic polarity is substantially opposite to the first magnetic polarity of the first magnet 2614. There is a change in direction of the magnetic flux and the magnetic field in the flux bar 2616 that may induce an electrical signal in the wire coil 2606. Similarly, an electrical signal may be induced in the wire coil 2606 when the belt buckle is released causing a substantially planar movement of the actuator 2608 from the second actuated position to the first position.

Figure 28:
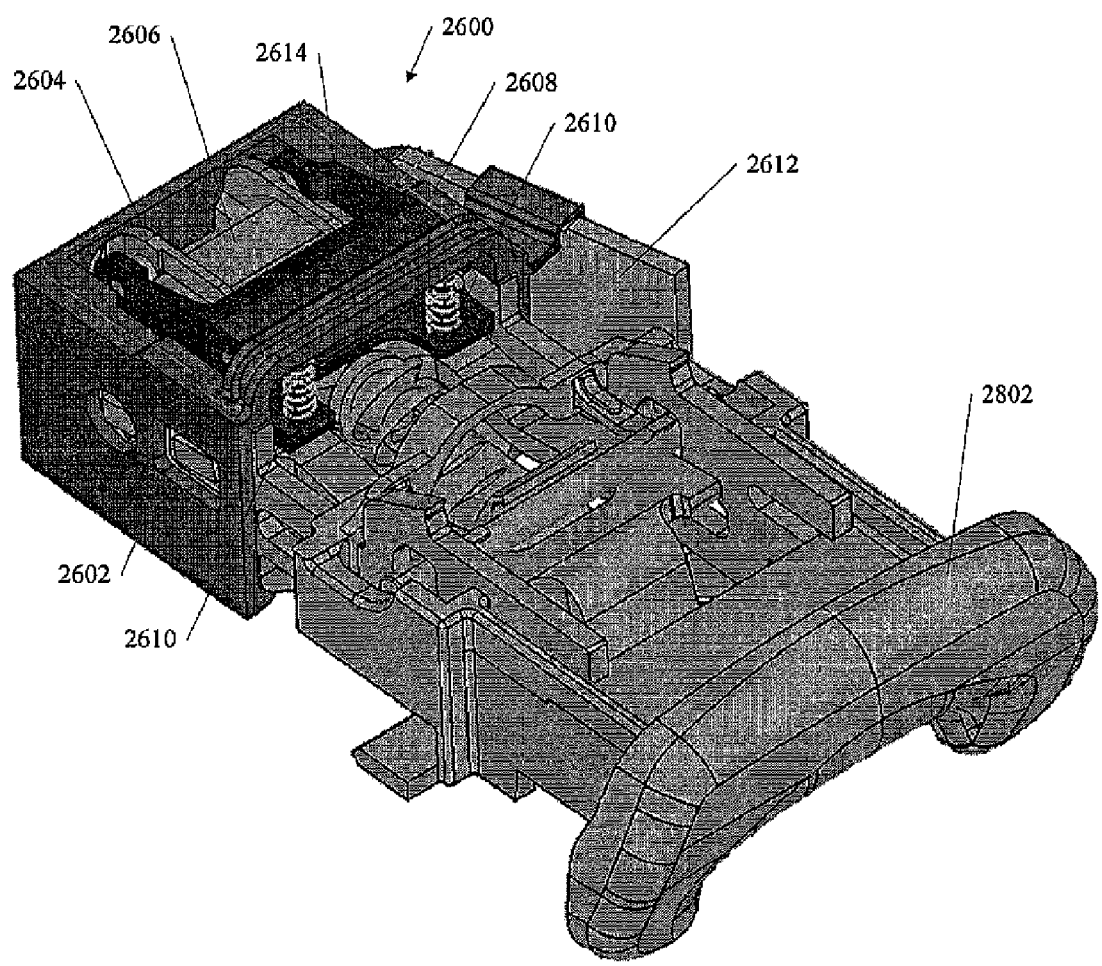
FIG. 28 is a perspective view of the alternative belt buckle of FIG. 26 including a buckle receptacle.

FIG. 28 is a perspective view of the alternative belt buckle 2600 of FIG. 26 including a buckle receptacle 2802. The buckle receptacle 2802 may receive a male end of the belt buckle. The buckle receptacle 2802 may be coupled to the belt buckle 2600 and may cause an engagement or release of the belt buckle 2600 when the male end is received or released. The belt buckle 2600 may be adapted to generate an electrical signal in response to a change in a magnetic field direction caused by an engagement or release of the belt buckle. Other buckle receptacles may be coupled to the belt buckle 2600 that can cause engagement or release of the belt buckle 2600, and that may receive a male end of the belt buckle.

Specific components of a self-powered sensor may include additional or different components. The voltage regulator, encryption unit, and/or decryption unit may be optional. Specific components may be implemented as a microcontroller, microprocessor, application specific integrated circuit, discrete circuitry, or a combination of other types of circuitry or logic. Logical functions or any element described may be implemented through digital circuitry, through source code, through analog circuitry, or through an analog source such as through an electrical, audio, video, or optical signal. The wireless communication signal may be implemented as a radio frequency signal, a microwave signal, an infrared or other optical signal, an acoustic signal, or other form of signal.

The self-powered sensor may be used with other technologies that detect or measure conditions. In some applications, multiple self-powered sensors may detect seat belt engagement and the presence of an occupant. If positioned below or within a seat, the self-powered sensor may identify an occupant's location by sensing their presence or weight. If a seat is in use and an occupant has not buckled their safety belt, a controller coupled to the receiver or transceiver may issue an audio, visual, and/or tactile reminder to the occupant, driver, or other occupants of the vehicle through one or more output devices. The self-powered sensors may also be used with other in-vehicle and out-vehicle systems. In vehicles, the self-powered sensor may monitor or identify unlatched doors, roofs, hoods, latches, compartments, antennas, unlocked doors, or differentiate a child from an adult. If a child is identified by sensing the level of voltage generated by the piezoelectric ceramic or element, other vehicle safety devices may be enabled or disabled (e.g., an air bag may be disabled or inflation rate modified). Other vehicle applications may include a controller coupled to the receiver or transceiver activating a light inside a vehicle when a door is opened; or detecting the status of a refrigerator, water pump, antenna, or other components in a camper, trailer, or recreational vehicle. Outside of a vehicle the self-powered sensor may be used with any wireless transmitter including keyless entry systems and/or remote controls.

While the self-powered sensor is described in the context of a vehicle, the self-powered sensor may also be used in non-vehicle applications to sense or monitor conditions. A self-powered sensor may monitor and/or identify doors, gates, windows, or the presence or absence of a person or thing. For example, if a self-powered sensor identifies that a door, gate, or window is open, or the presence or absence of a person or thing, a controller coupled to the receiver or transceiver may issue audio, visual, and/or tactile notifications through an output device. Based on the status, the controller may also control a device to turn it on or off, to perform a function, and/or to perform other actions (e.g., a fan may start when a person enters a ventilated area, a light may activate when a door is opened or when a vehicle pulls into a driveway, etc.). In some applications, a self-powered sensor may be used in a remote control unit (e.g., controlling a television, audio system, video tape recorder, etc.) to transmit a signal when a button is pushed. In a computer application, a self-powered sensor may be used to wirelessly transmit keystrokes, mouse movements, or other remote user interface inputs to the computer. Other applications may include detecting the latch status of a swimming pool gate, a garage door, or other doors, windows, or gates, which may be optionally integrated with an alarm system; detecting the presence of a person or thing (e.g., sensing the presence of a vehicle in a parking lot space, sensing the presence of a person in a movie theatre seat, transmitting the location of a person or thing using a Global Positioning System receiver, etc.); or as a source of generating energy for flashlights, portable radios, etc.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A wireless self-powered sensor, comprising:
   an electrodynamic generator adapted to induce a first electrical signal in response to a substantially planar movement of a carrier, a first magnet, or a second magnet between a first position and a second position that causes a change in a magnetic field direction in the carrier, the substantially planar movement caused by an event in a vehicle; where the carrier comprises a metal core and a wire loop wrapped around the metal core, the first magnet has a first magnetic polarity, and the second magnet has a second magnetic polarity, the second magnet positioned such that the second magnetic polarity is substantially opposite of the first magnetic polarity;
   a power conditioning circuit electrically coupled to the electrodynamic generator, the power conditioning circuit adapted to rectify and regulate the first electrical signal into a second electrical signal, the second electrical signal comprising a substantially constant voltage;
   an encryption circuit electrically coupled to the electrodynamic generator and the power conditioning circuit, the encryption circuit sourced by the second electrical signal and adapted to encode a unique message in a data packet; and
   a radio frequency transmitter electrically coupled to the encryption circuit, the radio frequency transmitter sourced by the second electrical signal and adapted to transmit the data packet,
   wherein the substantially planar movement causes a break in contact between the carrier and one of the first magnet or the second magnet.

2. The sensor of claim 1, where the event comprises an engagement or a release of a belt buckle, an opening or a closing of a door, or an engagement of a switch controlling a movement of a power window.

3. The sensor of claim 1, where the electrodynamic generator further comprises an actuator that causes the substantially planar movement of the carrier, the first magnet, or the second magnet between the first position and the second position.

4. The sensor of claim 1, where the carrier is adapted to carry a magnetic flux and the inducement of the first electrical signal is caused by a change in the magnetic flux direction as a result of the change in the magnetic field direction.

5. The sensor of claim 1, where the carrier further comprises a flux bar coupled to the core, where the flux bar is adapted to carry a magnetic flux, is in contact with the first magnet when in the first position, and is in contact with the second magnet when in the second position, and the inducement of the first electrical signal is caused by a change in the magnetic flux direction as a result of the change in the magnetic field direction.

6. The sensor of claim 1, where the carrier is in contact with the first magnet when in the first position and is in contact with second magnet when in the second position, and the substantially planar movement causes the carrier to break contact with one of the first and second magnets and allow attraction to the other of the first and second magnets.

7. The sensor of claim 1, where the substantially planar movement of the carrier comprises moving the carrier with respect to the first and second magnets, the first and second magnets being fixed.

8. The sensor of claim 1, where the substantially planar movement of the first and second magnets comprises moving the first and second magnets with respect to the carrier, the carrier being fixed.

9. The sensor of claim 1, further comprising return springs adapted to bias the carrier, the first magnet, or the second magnet from the second position to the first position.

10. A method, comprising:
    inducing a first electrical signal in response to a substantially planar movement between a first position and a second position of a carrier among a first magnet and a second magnet that causes a change in a magnetic field direction, the substantially planar movement caused by an event in a vehicle;
    conditioning the first electrical signal to a second electrical signal, the second electrical signal comprising a substantially constant voltage;
    sourcing an encryption and a transmission process with the second electrical signal;
    encoding a unique message in a data packet; and
    transmitting the data packet,
    wherein the substantially planar movement causes a break in contact between the carrier and one of the first magnet or the second magnet.

11. The method of claim 10, where the event comprises an engagement or a release of a belt buckle, an opening or a closing of a door, or an engagement of a switch controlling a movement of a power window.

12. The method of claim 10, where transmitting the data packet comprises transmitting a radio frequency signal.

13. The method of claim 10, further comprising sensing the event and generating a signal indicating the event.

14. The method of claim 10, further comprising sourcing a sensing process with the second electrical signal.

15. The method of claim 10, where conditioning the first electrical signal to a second electrical signal comprises rectifying the first electrical signal and regulating the first electrical signal to the second electrical signal.

16. The method of claim 10, further comprising receiving the data packet, and decrypting the data packet to the unique message.

17. A wireless self-powered sensor, comprising:
    an electrodynamic generator adapted to induce a first electrical signal in response to a substantially planar movement of a magnet carrier between a first position and a second position that causes a change in a magnetic field direction in an assembly, the assembly comprising a bobbin and a wire coil wrapped around the bobbin, and the planar movement caused by an engagement or a release of a belt buckle; where the magnet carrier comprises a first magnet with a first magnetic polarity and a second magnet with a second magnetic polarity, the second magnet positioned such that the second magnetic polarity is substantially opposite of the first magnetic polarity;
    a power conditioning circuit electrically coupled to the electrodynamic generator, the power conditioning circuit adapted to rectify and regulate the first electrical signal into a second electrical signal, the second electrical signal comprising a substantially constant voltage;

an encryption circuit electrically coupled to the electrodynamic generator and the power conditioning circuit, the encryption circuit sourced by the second electrical signal and adapted to encode a unique message in a data packet; and
a radio frequency transmitter electrically coupled to the encryption circuit, the radio frequency transmitter sourced by the second electrical signal and adapted to transmit the data packet,
where the substantially planar movement of the magnet carrier comprises moving the magnet carrier with respect to the assembly, the assembly being fixed.

18. The sensor of claim 17, where the electrodynamic generator further comprises an actuator that causes the substantially planar movement of the magnet carrier between the first position and the second position.

19. The sensor of claim 17, where the inducement of the first electrical signal is caused by a change in the magnetic flux direction as a result of the change in the magnetic field direction.

20. The sensor of claim 17, where the assembly further comprises a flux bar coupled to the wire coil, and where the flux bar is adapted to carry a magnetic flux, is in contact with the first magnet when in the first position, and is in contact with the second magnet when in the second position, and the inducement of the first electrical signal is caused by a change in the magnetic flux direction as a result of the change in the magnetic field direction.

21. The sensor of claim 20, where the substantially planar movement of the magnet carrier comprises moving the magnet carrier with respect to the flux bar, the flux bar being fixed.

22. The sensor of claim 17, further comprising return springs adapted to bias the magnet carrier from the second position to the first position.

23. The sensor of claim 17, where the electrodynamic generator is coupled to a buckle receptacle.

24. The sensor of claim 17, further comprising an energy storage device adapted to store the second electrical signal; and where the unique message comprises a status of the belt buckle, and the radio frequency transmitter is sourced by the energy storage device and is further adapted to continuously transmit the data packet.

* * * * *

UNITED STATES PATENT AND TRADEMARK OFFICE
CERTIFICATE OF CORRECTION

PATENT NO. : 7,710,288 B2  Page 1 of 1
APPLICATION NO. : 11/941708
DATED : May 4, 2010
INVENTOR(S) : Koji Seguchi et al.

It is certified that error appears in the above-identified patent and that said Letters Patent is hereby corrected as shown below:

On the Title Page

In the right column, replace entire line 1:

"5,406,262 A    4/1995    Herman et al."

with

--5,406,252    4/1995    Dear--.

In the right column, replace entire line 4:

"5,762,299 A    6/1998    Motsch"

with

--5,752,299    5/1998    Vivacqua et al.--.

In column 13, claim 1, line 37, after "radio frequency" replace "transmiffer" with --transmitter--.

In column 13, claim 1, line 42, before "the second" replace "or" with --and--.

In column 14, claim 10, line 30, replace "or the second" with --or second--.

Signed and Sealed this

Sixth Day of July, 2010

David J. Kappos
*Director of the United States Patent and Trademark Office*